(12) United States Patent
Park et al.

(10) Patent No.: US 11,930,506 B2
(45) Date of Patent: *Mar. 12, 2024

(54) METHOD AND APPARATUS FOR TRANSMITTING AND RECEIVING DATA IN WIRELESS COMMUNICATION SYSTEM

(71) Applicant: Samsung Electronics Co., Ltd., Suwon-si (KR)

(72) Inventors: Jinhyun Park, Suwon-si (KR); Hoondong Noh, Suwon-si (KR); Jeongho Yeo, Suwon-si (KR); Heecheol Yang, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

This patent is subject to a terminal disclaimer.

(21) Appl. No.: 17/559,359

(22) Filed: Dec. 22, 2021

(65) Prior Publication Data

US 2022/0116983 A1 Apr. 14, 2022

Related U.S. Application Data

(63) Continuation of application No. 16/791,364, filed on Feb. 14, 2020, now Pat. No. 11,219,057.

(30) Foreign Application Priority Data

Feb. 15, 2019 (KR) .................. 10-2019-0017553
Sep. 6, 2019 (KR) .................. 10-2019-0110940

(51) Int. Cl.
*H04W 72/23* (2023.01)
*H04J 13/00* (2011.01)
*H04W 72/0446* (2023.01)

(52) U.S. Cl.
CPC ......... *H04W 72/23* (2023.01); *H04J 13/0003* (2013.01); *H04W 72/0446* (2013.01)

(58) Field of Classification Search
CPC .................. H04J 13/0003; H04W 72/0446; H04W 72/23
(Continued)

(56) References Cited

U.S. PATENT DOCUMENTS 8,427,978 B2  4/2013 Xiao
11,133,853 B2 9/2021 Kang et al.
(Continued)

FOREIGN PATENT DOCUMENTS

CN  103828256 A    5/2014
EP  3 793 250 A1   3/2021
(Continued)

OTHER PUBLICATIONS

AT&T, "Single and Multi DCI NC-JT Framework for Multi TRP Transmission in NR", 3GPP TSG RAN WG1 Meeting #88, Athens, Greece Feb. 13-17, 2017, R1-1702259, available on Feb. 7, 2017.
(Continued)

*Primary Examiner* — Peter G Solinsky
(74) *Attorney, Agent, or Firm* — Jefferson IP Law, LLP

(57) ABSTRACT

A method of a terminal in a wireless communication system is provided. The method includes receiving, from at least one of transmission and reception points (TRPs), downlink control information (DCI) including first information on transmission configuration indication (TCI) states and second information for antenna ports, identifying whether each of the TRPs repeatedly transmits same data via a physical downlink shared channel (PDSCH) based on a number of code division multiplex (CDM) group indicated by the second information for antenna ports, and receiving data from the TRPs based on a result of the identifying.

16 Claims, 18 Drawing Sheets

(58) Field of Classification Search
USPC .......................................................... 370/329
See application file for complete search history.

(56) References Cited

U.S. PATENT DOCUMENTS

| | | | |
|---|---|---|---|
| 11,234,276 B2* | 1/2022 | Kung | .................... H04W 76/18 |
| 11,523,419 B2 | 12/2022 | Takeda et al. | |
| 2011/0013710 A1 | 1/2011 | Xiao | |
| 2014/0233520 A1 | 8/2014 | Lee et al. | |
| 2018/0048372 A1 | 2/2018 | Sun et al. | |
| 2018/0132227 A1 | 5/2018 | Ghosh et al. | |
| 2018/0343653 A1 | 11/2018 | Guo | |
| 2020/0008231 A1 | 1/2020 | Vilaipornsawai et al. | |
| 2020/0015200 A1 | 1/2020 | Vilaipornsawai et al. | |
| 2020/0015208 A1 | 1/2020 | Noh et al. | |
| 2020/0053757 A1 | 2/2020 | Bagheri et al. | |
| 2020/0145274 A1 | 5/2020 | Nammi | |
| 2020/0221428 A1 | 7/2020 | Moon et al. | |
| 2020/0221487 A1 | 7/2020 | Lee et al. | |
| 2020/0337058 A1 | 10/2020 | Song et al. | |
| 2021/0045142 A1 | 2/2021 | Joseph et al. | |
| 2021/0105785 A1 | 4/2021 | Manolakos et al. | |
| 2021/0112583 A1 | 4/2021 | Gao et al. | |
| 2021/0153188 A1 | 5/2021 | Wang et al. | |
| 2021/0204260 A1 | 7/2021 | Liu et al. | |
| 2021/0274538 A1* | 9/2021 | Liu | ................... H04W 72/0453 |

FOREIGN PATENT DOCUMENTS

| | | |
|---|---|---|
| KR | 10-2018-0105555 A | 9/2018 |
| WO | 2019/017751 A1 | 1/2019 |

OTHER PUBLICATIONS

Ericsson, "Multi-TRP Transmission", 3GPP TSG RAN WG1 Meeting #88, Athens, Greece, Feb. 13-17, 2017, R1-1702673, available on Feb. 7, 2017.
Samsung, "System level evaluation for non-fully overlapped NCJT", 3GPP TSG RAN WG1 Meeting #90, Prague, Czech Republic, Aug. 21-25, 2017, R1-1714578, available on Aug. 17, 2017.
NTT Docomo, Inc. (Rapporteur), "RAN WG's progress on NR WI in the January AH meeting 2018", 3GPP TSG-RAN WG2 #101, Athens, Greece, Feb. 26-Mar. 2, 2018, R2-1801889, available on Feb. 23, 2018.
International Search Report dated Apr. 21, 2020, issued in International Application No. PCT/KR2020/000485.
Written Opinion dated Apr. 21, 2020, issued in International Application No. PCT/KR2020/000485.
Final Office Action dated Nov. 24, 2021, issued in U.S. Appl. No. 16/740,261.
Non-Final Rejection dated Jun. 18, 2021, issued in U.S. Appl. No. 16/740,261.
Vivo, "Discussion on multi PDCCH based multi TRP transmission", R1-1900137, 3GPP TSG RAN WG1 Ad-Hoc Meeting 1901, Taipei, Taiwan, Jan. 12, 2019, sections 2-4.1; and table 7.3.1.2.2-1.
ZTE, "Enhancements on multi-TRP/Panel transmission", R1-1900087, 3GPP TSG RAN WG1 Ad-Hoc Meeting 1901, Taipei, Taiwan, Jan. 12, 2019, sections 2-2.3; and table 2.1-1a.
Huawei et al., "Single PDCCH based multi-TRP/panel transmission", R1-1900848, 3GPP TSG RAN WG1 Ad-Hoc Meeting 1901, Taipei, Taiwan, Jan. 12, 2019, sections 2-2.4; and figures 1-3.
International Search Report dated May 29, 2020, issued in International Patent Application No. PCT/KR2020/002116.
U.S. Office Action dated Oct. 14, 2022; U.S. Appl. No. 16/740,261.
U.S. Advisory Action dated Dec. 29, 2022; U.S. Appl. No. 16/740,261.
CATT; Considerations on multi-TRP/panel transmission; 3GPP TSG RAN WG1 #98bis; R1-1910349; Oct. 14-20, 2019; Chongqing, China.
Huawei et al.; Enhancements on multi-TRP/panel transmission; 3GPP TSG RAN WG1 Meeting #95; R1-1812243; Nov. 12-16, 2018; Spokane, USA.
European Search Report dated Feb. 9, 2022; European Appln. No. 20755070.8-1216 / 3903535 PCT/KR2020002116.
U.S. Office Action dated Mar. 30, 2022; U.S. Appl. No. 16/740,261.
U.S. Office Action dated Mar. 16, 2023; U.S. Appl. No. 16/740,261.
Indian Office Action dated Mar. 9, 2023; Indian Appln. No. 202137038906.
U.S. Notice of Allowance dated Sep. 8, 2023; U.S. Appl. No. 16/740,261.
Chinese Notice of Grant of Invention Patent Right with English translation dated Jan. 12, 2024; Chinese Appln. No. 202080012379.1.

* cited by examiner

METHOD AND APPARATUS FOR TRANSMITTING AND RECEIVING DATA IN WIRELESS COMMUNICATION SYSTEM

CROSS-REFERENCE TO RELATED APPLICATION(S)

This application is a continuation application of prior application Ser. No. 16/791,364 filed on Feb. 14, 2020, which has issued as U.S. Pat. No. 11,219,057 on Jan. 4, 2022; which is based on and claims priority under 35 U.S.C. § 119(a) of a Korean Patent Application No. 10-2019-0017553 filed on Feb. 15, 2019 in the Korean Intellectual Property Office, and of a Korean Patent Application No. 10-2019-0110940 filed on Sep. 6, 2019 in the Korean Intellectual Property Office, the disclosure of each of which is incorporated by reference herein in its entirety.

BACKGROUND

1. Field

The disclosure relates to a wireless communication system. More particularly, the disclosure relates to a method and apparatus for transmitting and receiving data in a wireless communication system.

2. Description of Related Art

To meet the demand for ever-increasing wireless data traffic after commercialization of the $4^{th}$ generation (4G) communication system, there have been efforts to develop an advanced $5^{th}$ generation (5G) or pre-5G communication system. For this reason, a 5G or pre-5G communication system is also called a beyond $4^{th}$-generation (4G) network communication system or post long term evolution (LTE) system. Implementation of 5G communication systems using ultra-frequency (mmWave) bands, e.g., 60 gigahertz (GHz) bands, has been considered to attain higher data transfer rates. To reduce propagation loss of radio waves and increase a transmission range in the ultra-frequency bands, beamforming, massive multiple-input multiple-output (MIMO), Full Dimensional MIMO (FD-MIMO), array antenna, analog beamforming, and large-scale antenna techniques are under discussion. To improve system networks, technologies for advanced small cells, cloud Radio Access Networks (RANs), ultra-dense networks, device to device (D2D) communication, wireless backhaul, moving networks, cooperative communication, Coordinated Multi-Points (CoMP), reception-end interference cancellation and the like have also been developed for 5G communication systems. In addition, an advanced coding modulation (ACM), e.g., hybrid frequency-shift keying (FSK) and quadrature amplitude modulation (QAM) (FQAM), sliding window superposition coding (SWSC), and an advanced access technology, e.g., filter bank multi carrier (FBMC), non-orthogonal multiple access (NOMA), and sparse code multiple access (SCMA), have been developed for 5G systems.

Also, the Internet has evolved from a human-centered connectivity network where humans generate and consume information to an Internet of Things (IoT) network where distributed entities such as things send, receive, and process information without human intervention. Internet of Everything (IoE) technologies combined with the IoT, such as big data processing technologies that operate through a connection to a cloud server, for example, have also emerged. To implement the IoT, various technologies, such as a sensing technology, a wired/wireless communication and network infrastructure, a service interfacing technology, and a security technology are required, and recently, even technologies for sensor network, Machine to Machine (M2M), Machine Type Communication (MTC) for connection between things have been studied. Such an IoT environment may provide intelligent Internet Technology (IT) services that are capable of creating new values in relation to the human life by collecting and analyzing data generated among connected things. The IoT may be applied to a variety of areas, such as smart homes, smart buildings, smart cities, smart cars or connected cars, smart grids, health care, smart home appliances, and advanced medical services through convergence and combination between existing Information Technologies (IT) and various industrial applications.

In this regard, various attempts to apply 5G communication systems to an IoT network have been made. For example, technologies regarding sensor networks, M2M, MTC, etc., have been implemented via 5G communication technologies, such as beamforming, MIMO, array antenna schemes, etc. Even an application of a cloud Radio Access Network (cloud RAN) as the aforementioned big data processing technology may be viewed as an example of convergence of 5G and IoT technologies.

As described above, with the development of wireless communication systems, a method of transmitting and receiving data for network cooperative communication is required.

The above information is presented as background information only to assist with an understanding of the disclosure. No determination has been made, and no assertion is made, as to whether any of the above might be applicable as prior art with regard to the disclosure

SUMMARY

Aspects of the disclosure are to address at least the above-mentioned problems and/or disadvantages and to provide at least the advantages described below. Accordingly, an aspect of the disclosure is to provide a method and apparatus for transmitting and receiving data between a transmitting node and a terminal for performing cooperative communication in a wireless communication system.

Additional aspects will be set forth in part in the description which follows and, in part, will be apparent from the description, or may be learned by practice of the presented embodiments.

In accordance with an aspect of the disclosure, a method of a terminal in a wireless communication system is provided. The method includes receiving, from at least one of transmission and reception points (TRPs), downlink control information (DCI) including first information on transmission configuration indication (TCI) states and second information for antenna ports, identifying whether each of the TRPs repeatedly transmits same data via a physical downlink shared channel (PDSCH) based on a number of code division multiplex (CDM) group indicated by the second information for antenna ports, and receiving data from the TRPs based on a result of the identifying.

In accordance with another aspect of the disclosure, a terminal in a wireless communication system is provided. The terminal includes a transceiver, and at least one processor configured to control the transceiver to receive, from at least one of transmission and reception points (TRPs), downlink control information (DCI) including first information on transmission configuration indication (TCI) states and second information for antenna ports, identify whether each of the TRPs repeatedly transmits same data via a physical downlink shared channel (PDSCH) based on a number of code division multiplex (CDM) group indicated by the second information for antenna ports, and control the transceiver to receive data from the TRPs based on a result of the identification.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures

DETAILED DESCRIPTION

Figure 1:
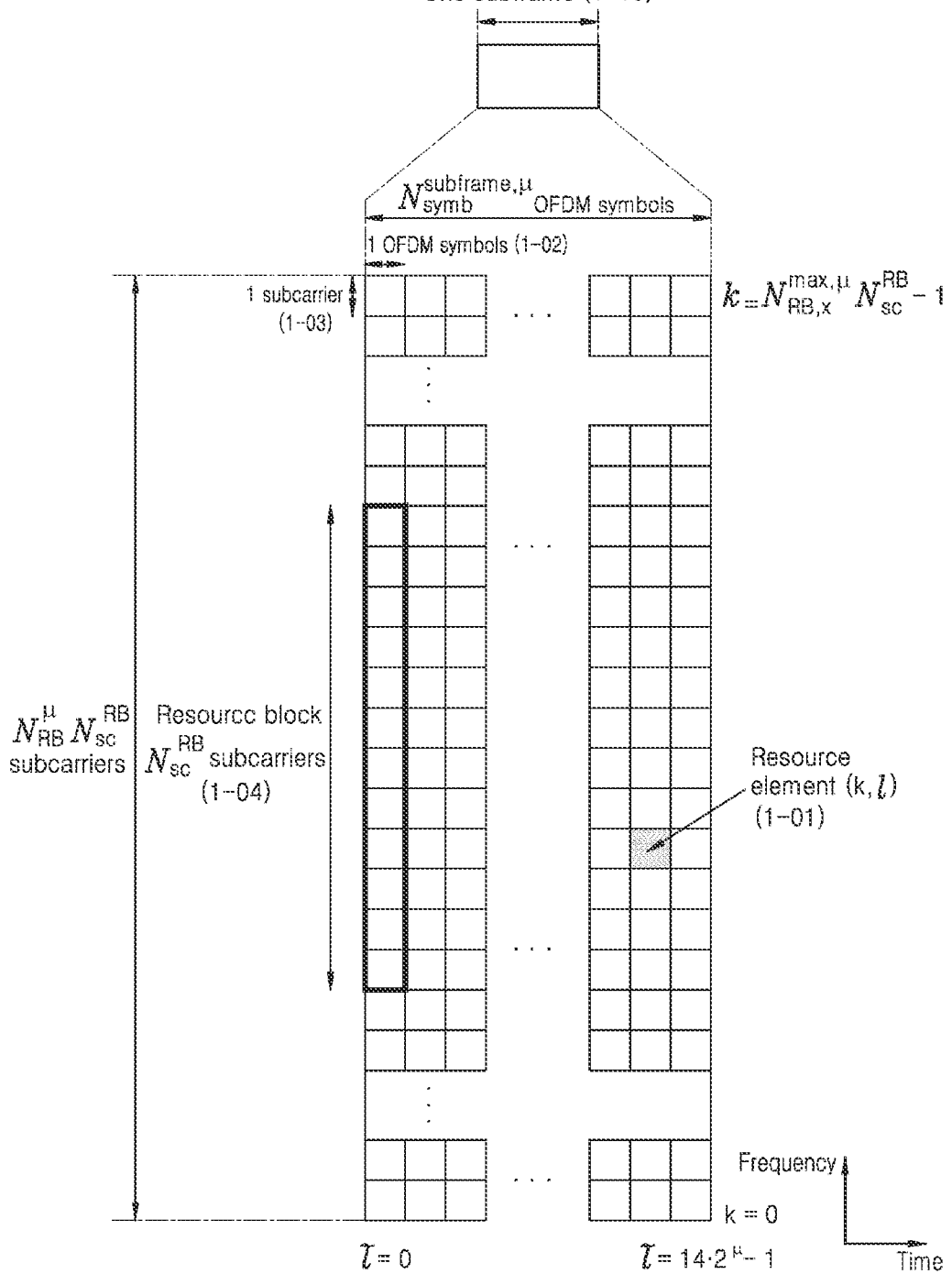
FIG. 1 shows a time-frequency domain transmission structure of Long Term Evolution (LTE), Evolved Universal Terrestrial Radio Access (E-UTRA), LTE-Advanced (LTE-A), New Radio (NR), or a similar wireless communication system according to an embodiment of the disclosure.

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Technological content well-known in the art or not directly related to the disclosure is omitted in the following description. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like numbers refer to like elements throughout the drawings.

Advantages, features and methods for achieving them will be understood more clearly when the following embodiments are read with reference to the accompanying drawings. The embodiments of the disclosure may, however, be embodied in many different forms and should not be construed as limited to the embodiments of the disclosure set forth herein; rather, these embodiments of the disclosure are provided so that this disclosure will be thorough and complete, and will fully convey the scope of the embodiments of the disclosure to those of skill in the art. Like numbers refer to like elements throughout the specification.

Throughout the disclosure, the expression "at least one of a, b or c" indicates only a, only b, only c, both a and b, both a and c, both b and c, all of a, b, and c, or variations thereof.

A terminal may include user equipment (UE), a mobile station (MS), a cellular phone, a smart phone, a computer, or a multimedia system capable of communication.

In the disclosure, a controller may also be referred to as a processor.

In the disclosure, a layer (or layer device) may also be referred to as an entity.

It will be understood that each blocks and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide operations for performing functions described in the block(s) of the flowchart.

Furthermore, each block may represent a part of a module, segment, or code including one or more executable instructions to perform particular logic function(s). It is noted that the functions described in the blocks may occur out of order in alternate embodiments of the disclosure. For example, two successive blocks may be performed substantially at the same time or in reverse order.

The term "module" (or sometimes "unit") as used herein refers to a software or hardware component, such as a field programmable gate array (FPGA) or an application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, micro-codes, circuits, data, databases, data structures, tables, arrays, and variables. Functions served by components and modules may be combined into a lesser number of components and modules, or further divided into a greater number of components and modules. Moreover, the components and modules may be implemented to execute one or more central processing units (CPUs) in a device or security multimedia card. In some embodiments, the module may include one or more processors.

Operating principles of embodiments of the disclosure will now be described with reference to accompanying drawings. Descriptions of some well-known technologies that possibly obscure the disclosure will be omitted, when necessary. Further, the terms as will be mentioned later, are defined by taking functionalities as will be described in the disclosure into account, but may vary depending on certain practices or intentions of users or operators. Accordingly, the terms should be defined based on the descriptions throughout this specification. In the following description, a base station is an entity for performing resource allocation for a terminal, and may be at least one of a gNB, an eNB, a Node B, a base station (BS), a radio access unit, a base station controller, or a network node. A terminal may include a UE, an MS, a cellular phone, a smart phone, a computer, or a multimedia system capable of communication. It is, of course, not limited thereto. A technology for a BS to receive broadcast information from a UE in a wireless communication system will now be described. The disclosure relates to a communication scheme and a system employing the same, which integrates an Internet of Things (IoT) technology with a 5th generation (5G) communication system to provide higher data transfer rates beyond the 4th generation (4G) system. The disclosure may be applied to intelligent services based on the 5G communication and IoT related technologies, e.g., smart home, smart buildings, smart cities, smart cars, connected cars, health care, digital education, smart retail, security and safety services.

In the following description, the terms referring to broadcast information, control information, state changes (e.g., events), network entities, messages, and components of an apparatus, the terms related to communication coverage, etc., are mentioned for convenience of explanation. That is, the disclosure is not limited to the following terms, but may use different terms having the same meaning in a technological sense.

For convenience of explanation, some of the terms and names defined by the 3rd generation partnership project long term evolution (3GPP LTE) will be used hereinafter. The disclosure is not, however, limited to the terms and definitions, and may be equally applied to any systems that conform to other standards.

Wireless communication systems are evolving from early systems that provide voice-oriented services to broadband wireless communication systems that provide high data rate and high quality packet data services such as 3GPP high speed packet access (HSPA), long term evolution (LTE) or evolved universal terrestrial radio access (E-UTRA), LTE-advanced (LTE-A), LTE-Pro, 3GPP2 high rate packet data (HRPD), ultra mobile broadband (UMB), and IEEE 802.16e communication standards.

As a representative example of such a broadband wireless communication system, an LTE system adopts Orthogonal Frequency Division Multiplexing (OFDM) for downlink (DL) and Single Carrier Frequency Division Multiple Access (SC-FDMA) for uplink (UL). The UL refers to a radio link for a UE or MS to transmit data or a control signal to an eNode B or BS, and the DL refers to a radio link for a BS to transmit data or a control signal to a UE or MS. Such a multiple access scheme allocates and operates time-frequency resources for carrying data or control information for respective users not to overlap each other, i.e., to maintain orthogonality, thereby differentiating each user's data or control information.

As a future communication system after the LTE, the 5G communication system needs to freely reflect various demands from users and service providers and thus support services that meet the various demands. The services considered for the 5G communication system may include enhanced Mobile Broadband (eMBB), massive Machine Type Communication (mMTC), Ultra Reliability Low Latency Communication (URLL), etc.

In an embodiment of the disclosure, the eMBB is aimed at providing more enhanced data rates than the rates that LTE, LTE-A, or LTE-Pro may support. For example, in the 5G communication system, the eMBB is required to provide 20 Gbps peak data rate in DL and 10 Gbps peak data rate in UL in terms of a single BS. Furthermore, the eMBB needs to provide increasing user perceived data rate while providing the peak data rate. To satisfy these requirements, technologies for transmission or reception including multiple-input multiple-output (MIMO) transmission technologies are required to be more enhanced. Furthermore, a frequency bandwidth wider than 20 MHz in a 3 to 6 GHz band or in a 6 GHz or a higher band instead of the 2 GHz currently used by LTE may be used, thereby satisfying the data rate required by the 5G communication system.

At the same time, in the 5G communication system, mMTC is considered to support an application service such as an Internet of Things (IoT) application service. In order for the mMTC to provide the IoT efficiently, support for access from massive number of terminals in a cell, enhanced coverage of the terminal, extended battery time, reduction in terminal price, etc., may be required. Because the IoT is equipped in various sensors and devices to provide communication functions, it may be supposed to support a large number of terminals in a cell (e.g., 1,000,000 terminals/km$^2$). Furthermore, a terminal supporting the mMTC is more likely to be located in a shadow area, such as underground of a building, which might not be covered by a cell by the nature of the service, so the mMTC may require a larger coverage than expected for other services provided by the 5G communication system. A terminal supporting the mMTC needs to be a low-cost terminal, and may require quite long battery life time because the battery in the terminal is hard to be changed frequently.

Finally, the ultra reliable low latency communication (URLLC) needs to provide ultra-low latency and ultra reliable communication for cellular-based wireless communication services for special purposes, such as remote control over robots or machinery, industrial automation, unmanned aerial vehicle, remote health care, emergency alert, etc. For example, URLLC services need to satisfy sub-millisecond (less than 0.5 millisecond) air interface latency and simultaneously require error rates lower than 1 packet loss in 10$^{-5}$ packets. Hence, for the URLLC services, the 5G system needs to provide a smaller transmit time interval (TTI) than for other services, and simultaneously requires a design that allocates a wide range of resources in a frequency band. The mMTC, URLLC, and eMBB are examples of different types of services, and embodiments of the disclosure are not limited to the service types.

The aforementioned services considered in the 5G communication system need to be provided by being integrated together on a framework basis. In other words, for efficient resource management and control, the respective services may be integrated, controlled, and transmitted in a system rather than being separately operated.

Although the following embodiments of the disclosure will now be focused on an LTE, LTE-A, LTE Pro or NR system for example, they may be equally applied to other communication systems with similar technical backgrounds or channel types. Furthermore, embodiments of the disclosure will also be applied to other communication systems with some modifications to such an extent that does not significantly deviate from the scope of the disclosure when judged by those of ordinary skill in the art.

The disclosure relates to a method and apparatus for repetitively transmitting data and control signals between multiple transmitting nodes that perform cooperative communication and a terminal, to increase communication reliability.

According to the disclosure, when the network cooperative communication is used in a wireless communication system, reliability in reception of data/control signals at the terminal may be improved.

A frame structure in a 5G system will now be described in more detail with reference to the accompanying drawings.

FIG. 1 shows a transmission structure in the time-frequency domain of LTE, LTE-A, NR, or a similar wireless communication system according to an embodiment of the disclosure.

In other words, FIG. 1 shows a basic structure of the time-frequency domain, which is a radio resource domain in which data or a control channel is transmitted in a 5G system.

Referring to FIG. 1, the horizontal axis represents the time domain, and the vertical axis represents the frequency domain. A basic resource unit in the time and frequency domain is a resource element (RE) 1-01, which may be defined as one Orthogonal Frequency Division Multiplexing (OFDM) symbol 1-02 of a subframe 1-10 in the time domain and one subcarrier 1-03 in the frequency domain. In the frequency domain, $N_{SC}^{RB}$ (e.g., 12) consecutive REs may constitute a single resource block (RB) 1-04.

Figure 2:
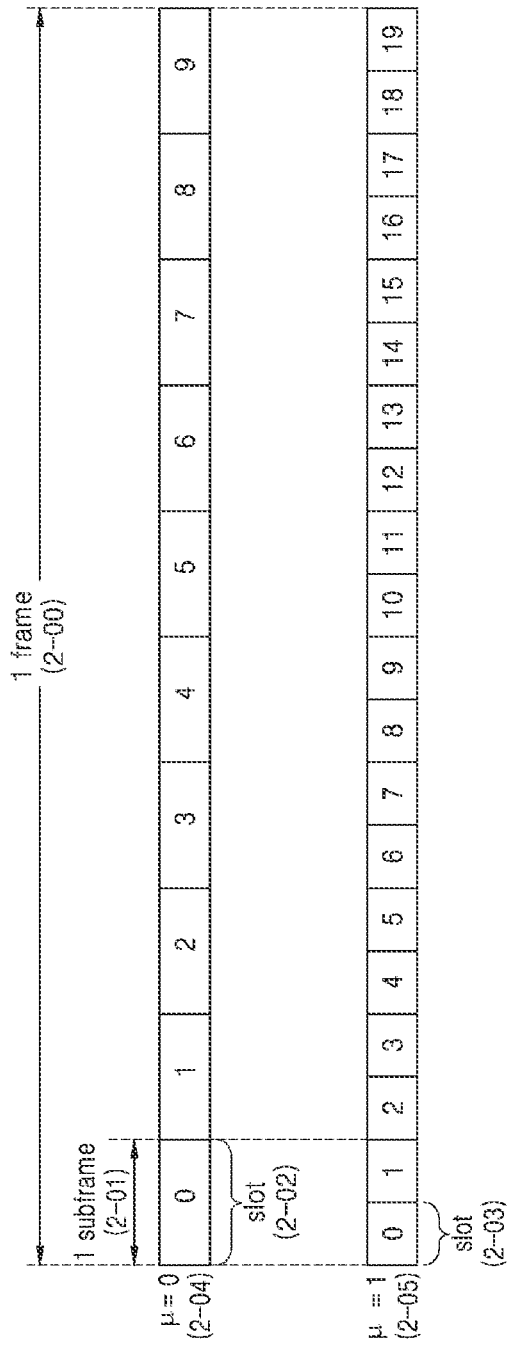
FIG. 2 shows a frame, subframe, and slot structure in 5G (the 5th generation) according to an embodiment of the disclosure.

FIG. 2 shows a frame, subframe, and slot structure in 5G according to an embodiment of the disclosure.

For example, FIG. 2 shows a slot structure considered in the 5G system.

Referring to FIG. 2, an example of frame 2-00, subframe 2-01, and slot 2-02 structures is shown. A frame 2-00 may be defined to be 10 ms. A subframe 2-01 may be defined to be 1 ms, and thus a total of 10 subframes 2-01 may constitute the one frame 2-00. A slot 2-02 or 2-03 may be defined to have 14 OFDM symbols (i.e., the number of symbols per 1 slot ($N_{symb}^{slot}$)=14). The one subframe 2-01 may include one or more slots 2-02 or 2-03, and the number of slots 2-02 or 2-03 per 1 subframe may vary depending on subcarrier spacing setting values μ (2-04 and 2-05). In the example of FIG. 2, the subcarrier spacing setting values are 0 and 1, i.e., μ=0 (2-04) and μ=1 (2-05). In the case of μ=0 (2-04), the one subframe 2-01 may include one slot 2-02, and in the case of μ=1 (2-05), the one subframe 2-01 may include two slots 2-03. That is, depending on the subcarrier spacing setting value μ, the number of slots per a subframe ($N_{slot}^{subframe,\mu}$) may vary and the number of slots per a frame ($N_{slot}^{frame,\mu}$) may vary accordingly. $N_{slot}^{subframe,\mu}$ and $N_{slot}^{frame,\mu}$ depending on the subcarrier spacing setting value μ may be defined as in the following Table 1.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Figure 3:
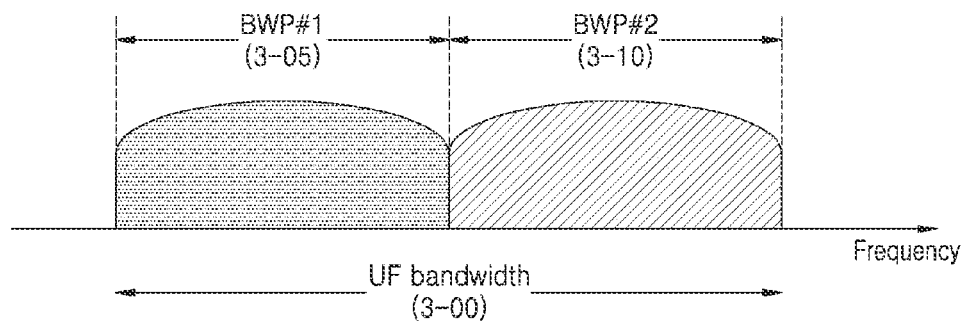
FIG. 3 shows an example of a configuration of bandwidth parts (BWPs) in a wireless communication system, according to an embodiment of the disclosure.

In NR, one component carrier (CC) or a serving cell may include 250 or more RBs. Accordingly, when UE constantly receives the entire serving cell bandwidth as in LTE, the UE may consume too much power. To solve this problem, a BS may configure one or more bandwidth parts (BWPs) for the UE to support the UE to be able to change receiving areas in a cell. In NR, the BS may configure an 'initial BWP', which is bandwidth of control resource set (CORESET) #0 (or common search space (CSS)) for the UE in a master information block (MIB). Subsequently, the BS may configure a first BWP for the UE through radio resource control (RRC) signaling, and then notify at least one piece of BWP configuration information, which may be indicated in downlink control information (DCI) later on. After this, the BS may indicate which band the UE may use by announcing a BWP ID in DCI. When the UE fails to receive the DCI in the currently allocated BWP for a particular period of time, the UE returns to a 'default BWP' to try reception of the DCI. FIG. 3 shows an example of a configuration of BWPs in a wireless communication system, according to an embodiment of the disclosure.

FIG. 3 shows an example of a BWP configuration in a 5G communication system according to an embodiment of the disclosure.

Referring to FIG. 3, two BWPs, BWP #1 3-05 and BWP #2 3-10 are configured in UE bandwidth 3-00. A BS may configure one or multiple BWPs for the UE, and configure information as in Table 2 for each BWP.

TABLE 2

| | |
|---|---|
| Configuration information 1 | Bandwidth of BWP (the number of physical resource blocks (PRB)s of the BWP) |
| Configuration information 2 | Frequency positions of BWPs (for this information, there may an offset value relative to a reference point, which may be, e.g., a center frequency of a carrier, a sync signal, a sync raster, etc.) |
| Configuration information 3 | Numerologies of BWPs (e.g., subcarrier spacing, cyclic prefix (CP) length, etc.) |
| Others | |

Apart from the configuration information as described in Table 2, various parameters related to the BWP may be configured for the UE. The above information may be transmitted by the BS to the UE through upper layer signaling, e.g., RRC signaling. At least one of the configured one or more BWPs may be activated. Whether to activate a configured BWP may be notified from the BS to the UE semi-statically through RRC signaling or dynamically through a medium access control (MAC) control element (CE) or DCI.

Such a configuration of the BWP supported by the 5G communication system may be used for various purposes.

For example, when the bandwidth supported by the UE is less than the system bandwidth, the bandwidth supported by the UE may be supported through a configuration of BWPs. For example, in Table 2, as the frequency position of the BWP (configuration information 2) is configured for the UE, the UE may transmit or receive data at the particular frequency position in the system bandwidth.

In another example, for the purpose of supporting different numerologies, the BS may configure a plurality of BWPs for the UE. For example, to support data transmission and reception using both 15 KHz subcarrier spacing and 30 KHz subcarrier spacing for a UE, two BWPs may be configured to use 15 KHz and 30 KHz subcarrier spacings, respectively. The different BWPs may be frequency division multiplexed, and for data transmission and reception with particular subcarrier spacing, a BWP configured with the subcarrier spacing may be activated.

Figure 4:
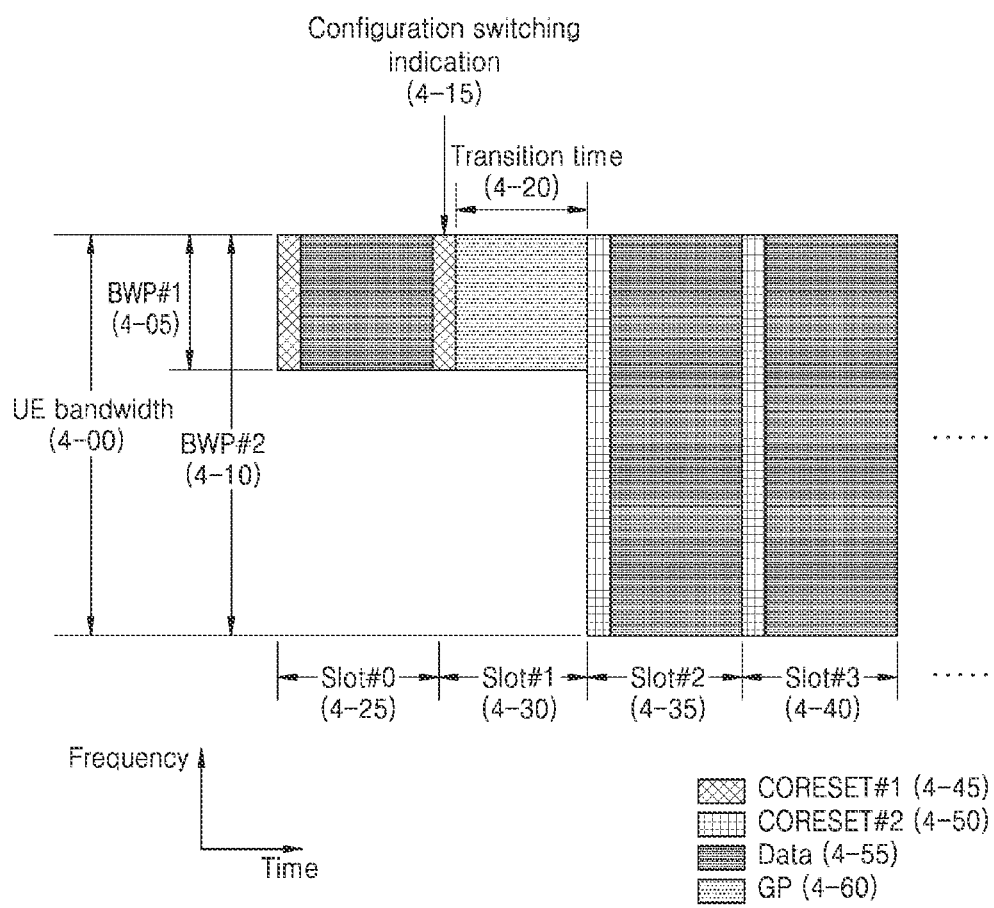
FIG. 4 shows a BWP indication and change in a wireless communication system, according to an embodiment of the disclosure.

In another example, for the purpose of reducing power consumption of the UE, the BS may configure BWPs with different bandwidth sizes for the UE. For example, when the UE supports a very large bandwidth, e.g., 100 MHz bandwidth, and transmits or receives data in this bandwidth, the UE may consume very much power. In a situation where there is no traffic in particular, monitoring an unnecessary DL control channel of the large 100 MHz bandwidth may be very inefficient in terms of power consumption. Hence, to reduce power consumption of the UE, the BS may configure a BWP with a relatively small bandwidth, e.g., a 20 MHz BWP, for the UE. In the situation that there is no traffic, the UE may perform monitoring in the 20 MHz BWP, and when data occurs, the UE may transmit or receive the data in the 100 MHz BWP under instructions from the BS. FIG. 4 shows a BWP indication and change in a wireless communication system, according to an embodiment of the disclosure.

FIG. 4 shows a method of dynamically changing a BWP configuration according to an embodiment of the disclosure.

Referring to FIG. 4, as described above in connection with Table 2, the BS may configure one or multiple BWPs, and notify the UE of information about bandwidth of each BWP, a frequency position of the BWP, numerology of the BWP, etc., in the configuration of the BWP. In FIG. 4, two BWPs, BWP #1 4-05 and BWP #2 4-10 in UE bandwidth 4-00 are configured for the UE. One or more BWPs among the configured BWPs may be activated, and in FIG. 4, for example, one BWP is activated. Specifically, in FIG. 4, BWP #1 4-05 of the BWPs configured in slot #0 4-25 is activated, and the UE may monitor a physical downlink control channel (PDCCH) in control resource set #1 4-45 configured in the BWP #1 4-05 and transmit or receive data 4-55 in BWP #1 4-05. The control resource set in which the UE receives the PDCCH may be different depending on which one of the configured BWPs is activated, and accordingly, the bandwidth for the UE to monitor a PDCCH may be different. For example, the UE may instead monitor a PDCCH in control resource set #2 4-50.

The BS may additionally transmit an indicator to switch the configuration of the BWP. Switching the configuration of the BWP may be equally regarded as activating a particular BWP (e.g., switching activation from BWP A to BWP B). The BS may transmit a configuration switching indicator to the UE, and the UE may then determine a BWP to be activated by applying a configuration switched based on the configuration switching indicator from a particular point in time after receiving the configuration switching indicator from the BS, and monitor a PDCCH in the control resource set configured for the activated BWP.

In FIG. 4, the BS may transmit a configuration switching indicator 4-15 indicating switching of BWP activation from BWP #1 4-05 to BWP #2 4-10 to the UE in slot #1 4-30. After receiving the indicator, the UE may activate the BWP #2 4-10 according to the description of the indicator. In this case, a transition time 4-20 for BWP switching may be required, and accordingly, a time to apply the BWP switching for activation may be determined. For example, in FIG. 4, after reception of the configuration switching indicator 4-15, one slot of transition time 4-20 is required. During the transition time 4-20, data transmission or reception may not be performed in 4-60. Hence, BWP #2 4-10 is activated in slot #2 4-35, and operation of transmitting or receiving a control channel and data in the activated BWP may be performed. Similarly, BWP #2 4-10 may be activated in slot #3 4-40, and operation of transmitting or receiving a control channel and data in the activated BWP may be performed The BS may pre-configure one or multiple BWPs for the UE via upper layer signaling (e.g., RRC signaling), and the configuration switching indicator 4-15 may indicate the activation in a way to map the configuration switching indicator 4-15 to one of BWPs pre-configured by the BS. For example, the indicator in $\log_2 N$ bits may select and indicate one of the pre-configured N BWPs. An example of indicating configuration information about a BWP using 2-bit indicator is shown in Table 3.

TABLE 3

| Indicator value | BWP configuration |
|---|---|
| 00 | Bandwidth configuration A configured by upper layer signaling |
| 01 | Bandwidth configuration B configured by upper layer signaling |
| 10 | Bandwidth configuration C configured by upper layer signaling |
| 11 | Bandwidth configuration D configured by upper layer signaling |

The configuration switching indicator 4-15 for the BWP as described in FIG. 4 may be transmitted in the type of MAC CE signaling or layer 1 (L1) signaling (e.g., common DCI, group-shared DCI, UE-specific DCI) from the BS to the UE.

Based on the configuration switching indicator 4-15 for the BWP as described in FIG. 4, when to apply BWP activation may follow the following: When to apply the configuration switching may be determined according to a predefined value (e.g., $N(\geq 1)$ slots after reception of the configuration switching indicator), be set by the BS through upper layer signaling (e.g., RRC signaling) for the UE, or notified partly in the configuration switching indicator 4-15. Alternatively, then to apply the configuration switching may be determined by a combination of the above methods. The UE may apply the changed configuration from a point in time obtained in the aforementioned method after receiving the configuration switching indicator 4-15 for BWP.

A DL control channel in the 5G communication system will now be described in detail with reference to related drawings.

Figure 5:
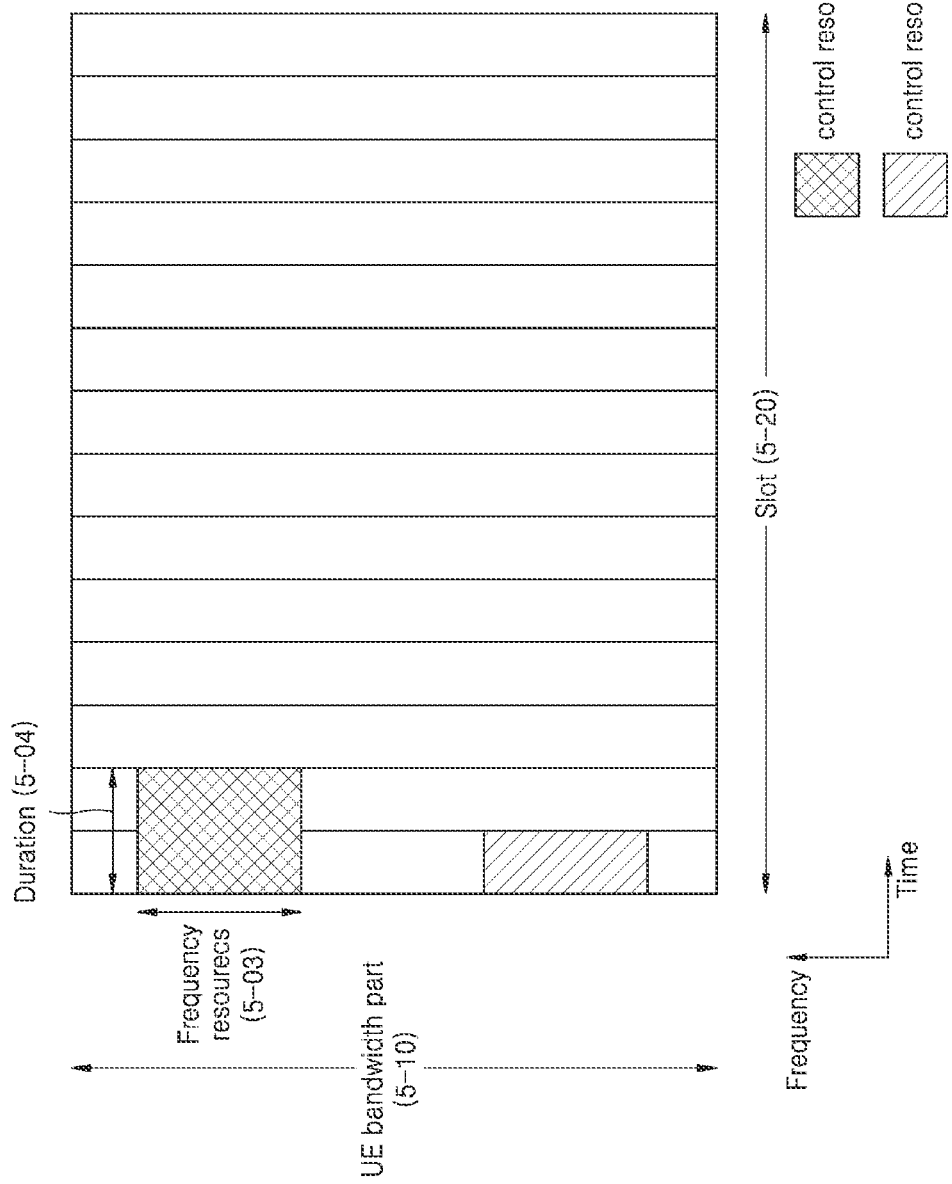
FIG. 5 shows an example of configuring control resource sets of a downlink control channel in a wireless communication system, according to an embodiment of the disclosure.

FIG. 5 shows an example of configuring control resource sets of a DL control channel in a wireless communication system, according to an embodiment of the disclosure.

Specifically, FIG. 5 shows an example of control resource sets (or CORESETs) in which a DL control channel is transmitted in the 5G wireless communication system.

Referring to FIG. 5, two control resource sets, control resource set #1 5-01 and control resource set #2 5-02, are configured in a BWP 5-10 in the frequency domain and in a slot 5-20 in the time domain. The control resource sets 5-01 and 5-02 may be configured in a particular frequency resource 5-03 in the entire UE BWP 5-10 in the frequency domain. The control resource sets 5-01 and 5-02 may be configured in one or more OFDM symbols in the time domain, and may be defined by control resource set duration 5-04. In the example of FIG. 5, the control resource set #1 5-01 is configured to have the control resource set duration of two symbols, and the control resource set #2 5-02 is configured to have the control resource set duration of one symbol.

As described above, in 5G, the control resource set may be configured by the BS for the UE through upper layer signaling, e.g., system information (SI), MIB, or RRC signaling. Configuring the UE with the control resource set refers to providing the UE with information such as a control resource set ID, a frequency position of the control resource set, length of symbols of the control resource set, etc. For example, information in Table 4 may be included in the above information.

TABLE 4

```
ControlResourceSet ::=                    SEQUENCE {
Corresponds to L1 parameter 'CORESET-ID'
controlResourceSetId                      ,
(Control Resource Set Identity)
frequencyDomainResources                  BIT STRING (SIZE
(45)),
    (Frequency Domain Resource Allocation Information)
    duration                              INTEGER
(1..maxCoReSetDuration),
    (Time Domain Resource Allocation Information)
    cce-REG-MappingType
    CHOICE {
    (CCE-to-REG Mapping Type)
    interleaved                           SEQUENCE {
    reg-BundleSize
    ENUMERATED {n2, n3, n6},
    (REG bundle size)
    precoderGranularity
    ENUMERATED {sameAsREG-bundle, allContiguousRBs},
    interleaverSize
    ENUMERATED {n2, n3, n6}
    (Interleaver Size)
    shiftIndex
    INTEGER(0..maxNrofPhysicalResourceBlocks-1)
                    OPTIONAL
    (Interleaver Shift)
    },
    nonInterleaved                        NULL
    }
    tci-StatesPDCCH
    SEQUENCE(SIZE (1..maxNrofTCI-StatesPDCCH)) OF TCI-StateId
            OPTIONAL,
    (QCL configuration information)
    tci-PresentInDCI                      ENUMERATED
{enabled}
        OPTIONAL, -- Need S
    }
```

In Table 4, tci-StatesPDCCH (simply called a TCI state) configuration information may include information about one or more synchronization signal (SS)/Physical Broadcast Channel (PBCH) block indexes having the Quasi co-located (QCL) relation with the Demodulation Reference Signal (DMRS) transmitted in the corresponding control resource set or channel state information reference signal (CSI-RS) indexes.

Hereinafter, methods of allocating time and frequency resources for data transmission in NR will now be described.

In NR, in addition to candidate frequency domain resource allocation through BWP indication, detailed frequency domain resource allocation (FD-RA) may be provided as follows.

Figure 6:
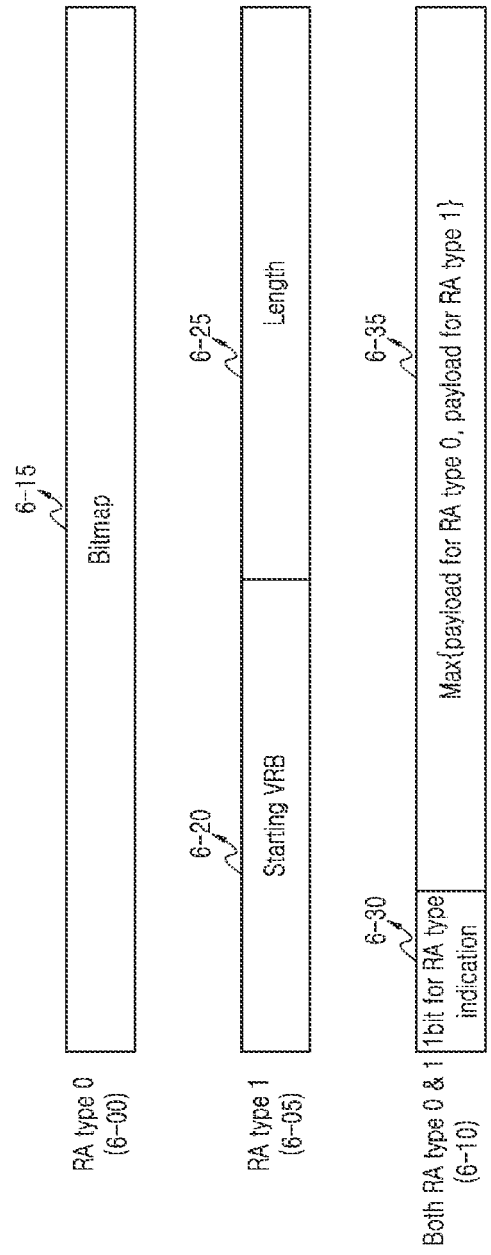
FIG. 6 shows resource allocations in the physical downlink shared channel (PDSCH) frequency domain in a wireless communication system, according to an embodiment of the disclosure.

FIG. 6 shows resource allocations in a PDSCH frequency domain in a wireless communication system, according to an embodiment of the disclosure.

Specifically, FIG. 6 shows three frequency domain resource allocation methods, which are type 0 6-00, type 1 6-05, and dynamic switching 6-10 configurable through an upper layer in NR.

Referring to FIG. 6, when the UE is configured by the upper layer signaling to use resource type 0 only (6-00), some DCI to allocate a PDSCH for the UE has a bitmap including NRBG bits. Conditions therefor will be described at a later time. The NRBG refers to the number of resource block groups (RBGs) determined as in the following Table 5 according to a size of a BWP allocated by the BWP indicator and an upper layer parameter rbg-Size, and data is transmitted in an RBG represented by 1 based on the bitmap.

TABLE 5

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the UE is configured by the upper layer signaling to use resource type 1 only (6-05), some DCI to allocate a PDSCH for the UE has frequency domain resource allocation information including $\lceil \log_2(N_{RB}^{DL,BWP}(N_{RB}^{DL,BWP}+1)/2) \rceil$ bits. Conditions therefor will be described at a later time. This may allow the BS to set a starting VRB 6-20 and length of frequency domain resources 6-25 allocated continuously from the starting VRB 6-20.

When the UE is configured to use both the resource type 0 and the resource type 1 through upper layer signaling (6-10), some DCI to allocate a PDSCH for the UE has frequency domain resource allocation information in bits 6-35 corresponding to a larger one of a payload 6-15 for configuring the resource type 0 and a payload 6-20 for configuring the resource type 1. Conditions therefor will be described at a later time. In this case, one bit 6-30 may be added to the most significant bit (MSB) of the frequency domain allocation information in the DCI, and when the bit has '0', it indicates that the resource type 0 is used, and when the bit has '1', it indicates that the resource type 1 is used.

Figure 7:
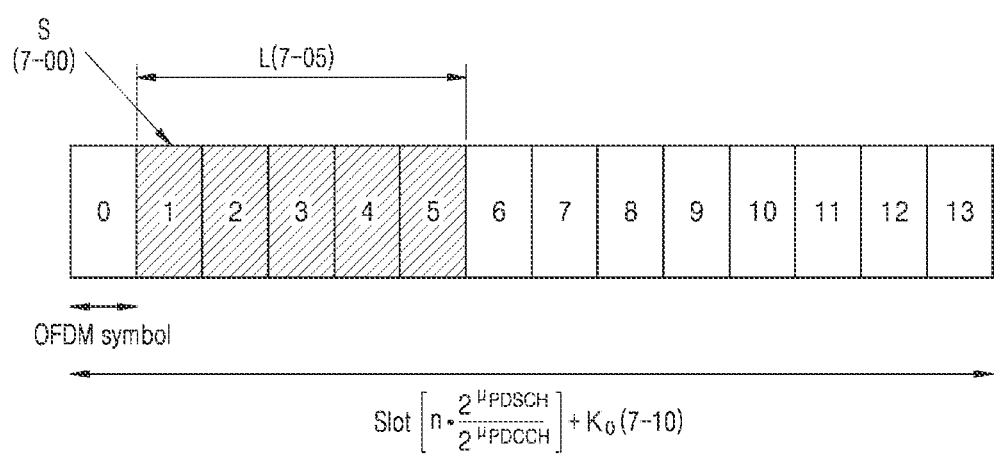
FIG. 7 shows resource allocation in the PDSCH time domain in a wireless communication system, according to an embodiment of the disclosure.

FIG. 7 shows resource allocation in the time domain of a PDSCH in a wireless communication system, according to an embodiment of the disclosure.

For example, FIG. 7 shows an example of time domain resource allocation in NR.

Referring to FIG. 7, the BS may indicate a position of a PDSCH resource in the time domain based on subcarrier spacings (SCSs) on a data channel and a control channel ($\mu_{PDSCH}$, $\mu_{PDCCH}$) and a scheduling offset $K_0$, which are set using an upper layer, and a starting position 7-00 and length 7-05 of OFDM symbols in a slot dynamically indicated in DCI.

Figure 8:
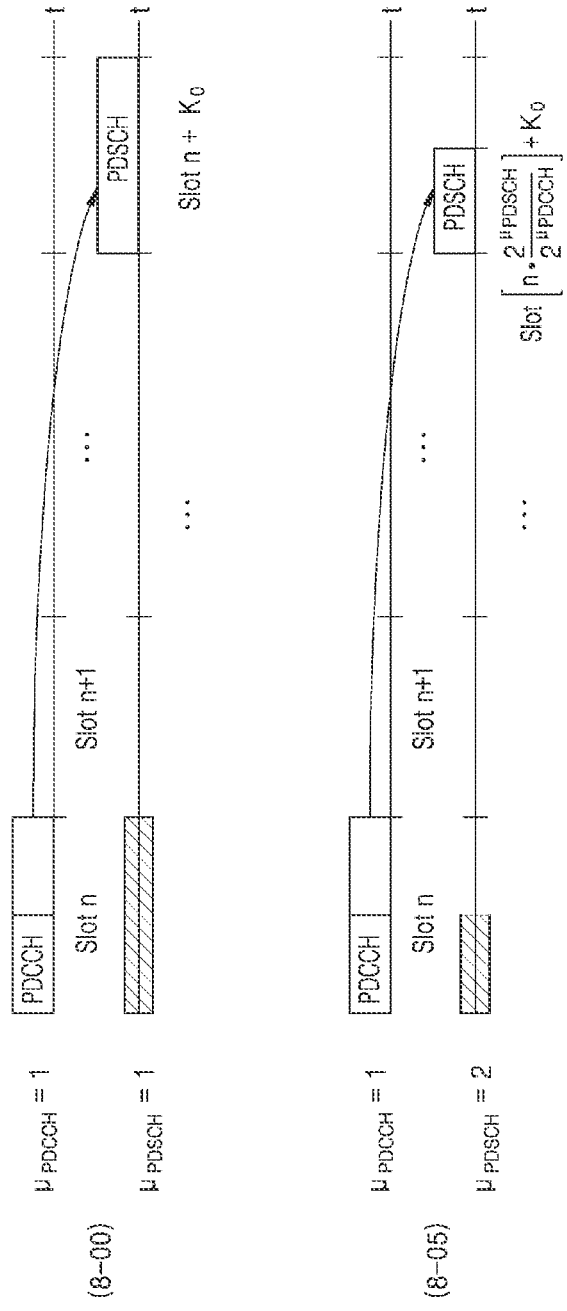
FIG. 8 shows resource allocation in the time domain based on subcarrier spacings of a data channel and control channel in a wireless communication system, according to an embodiment of the disclosure.

FIG. 8 shows resource allocation in the time domain based on SCSs on a data channel and a control channel in a wireless communication system, according to an embodiment of the disclosure.

Referring to FIG. 8, when the data channel and the control channel have the same SCS 8-00, $\mu_{PDSCH}=\mu_{PDCCH}$, slot numbers are the same for data and control, so the BS and the UE may expect scheduling offset occurring according to preset slot offset $K_0$. On the other hand, when the data channel and the control channel have different SCSs 8-05, $\mu_{PDSCH}\neq\mu_{PDCCH}$, slot numbers are different for data and control, so the BS and the UE may expect scheduling offset occurring according to preset slot offset $K_0$ based on the SCS of the PDCCH.

In NR, various DCI formats are provided as in Table 6 for different purposes for efficient control channel reception of the UE.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |

TABLE 6-continued

| DCI format | Usage |
|---|---|
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, the BS may use DCI format 0_0 or DCI format 0_1 to schedule a PDSCH in one cell.

When DCI format 0_1 is transmitted along with cyclic redundancy check (CRC) scrambled by a Cell Radio Network Temporary Identifier (C-RNTI), a configured scheduling RNTI (CS-RNTI), or a new RNTI, it includes information at least as follows:

Identifier for DCI formats (1 bit): set always to 1 as the DCI format indicator

Frequency domain resource allocation ($N_{RBG}$ bits or $\lceil \log_2(N_{RB}^{DL,BWP}(N_{RB}^{DL,BWP}+1)/2) \rceil$ bits): indicates frequency domain resource allocation, and when DCI format 1_0 is monitored in a UE-specific search space, $N_{RB}^{DL,BWP}$ is the size of an active DL BWP, and otherwise, $N_{RB}^{DL,BWP}$ is the size of an initial DL BWP. $N_{RBG}$ is the number of resource block groups. Details of the method refer to the frequency domain resource allocation.

Time domain resource allocation (0~4 bits): indicates time domain resource allocation according to the above description.

VRB-to-PRB mapping (1 bit): 0 for non-interleaved, and 1 for interleaved VRP-to-PRB mapping.

Modulation and coding scheme (5 bits): indicates a modulation order and coding rate used for PDSCH transmission.

New data indicator (1 bit): indicates initial transmission or retransmission according to whether it is toggled or not.

Redundancy version (2 bits): indicates a redundancy version used for PDSCH transmission.

HARQ process number (4 bits): indicates an HARQ process number used for PDSCH transmission.

Downlink allocation index (2 bits): a DAI indicator.

TPC command for scheduled PUCCH (2 bits): a PUCCH power control indicator.

PUCCH resource indicator (3 bits): a PUCCH resource indicator indicating one of 8 resources configured by an upper layer.

PDSCH-to-HARQ_feedback timing indicator (3 bits): an HARQ feedback timing indicator indicating one of 8 feedback timing offsets set by an upper layer.

When DCI format 1_1 is transmitted along with CRC scrambled by a C-RNTI, a CS-RNTI, or a new RNTI, it includes information at least as follows:

Identifier for DCI formats (1 bit): set always to 1 as the DCI format indicator.

Carrier indicator (0 or 3 bits): indicates CC (or a cell) for which a PDSCH allocated in the DCI is transmitted.

Bandwidth part indicator (0, 1, or 2 bits): indicates a BWP in which a PDSCH allocated in the DCI is transmitted.

Frequency domain resource allocation (determining a payload according to the frequency domain resource allocation): indicates frequency domain resource allocation and $N_{RB}^{DL,BWP}$ is a size of an active DL BWP. Details of the method refer to the frequency domain resource allocation.

Time domain resource allocation (0~4 bits): indicates time domain resource allocation according to the above description.

VRB-to-PRB mapping (0 or 1 bit): 0 for non-interleaved, and 1 for interleaved VRP-to-PRB mapping. It has 0 bit when the frequency domain resource allocation is set to the resource type 0.

PRB bundling size indicator (0 or 1 bit): 0 bit when an upper layer parameter, prb-BundlingType, is not set or is set as 'static', and 1 bit when prb-BundlingType is set as 'dynamic'.

Rate matching indicator (0, 1 or 2 bits): indicates a rate matching pattern.

ZP CSI-RS trigger (0, 1 or 2 bits): an indicator that triggers aperiodic ZP CSI-RS.

For transport block 1:

Modulation and coding scheme (5 bits): indicates a modulation order and coding rate used for PDSCH transmission.

New data indicator (1 bit): indicates initial transmission or retransmission according to whether it is toggled or not.

Redundancy version (2 bits): indicates a redundancy version used for PDSCH transmission.

For transport block 2:

Modulation and coding scheme (5 bits): indicates a modulation order and coding rate used for PDSCH transmission.

New data indicator (1 bit): indicates initial transmission or retransmission according to whether it is toggled or not.

Redundancy version (2 bits): indicates a redundancy version used for PDSCH transmission.

HARQ process number (4 bits): indicates an HARQ process number used for PDSCH transmission.

Downlink allocation index (0, 2 or 4 bits): a DAI indicator

TPC command for scheduled PUCCH (2 bits): a PUCCH power control indicator.

PUCCH resource indicator (3 bits): a PUCCH resource indicator indicating one of 8 resources configured by an upper layer PDSCH-to-HARQ_feedback timing indicator (3 bits): an HARQ feedback timing indicator indicating one of 8 feedback timing offsets set by an upper layer.

Antenna port (4, 5 or 6 bits): indicates a DMRS port and a CDM group without data.

Transmission configuration indication (0 or 3 bits): a TCI indicator.

SRS request (2 or 3 bits): an SRS transmission request indicator

CBG transmission information (0, 2, 4, 6 or 8 bits): an indicator indicating whether code block groups on the allocated PDSCH are transmitted. '0' refers to a corresponding CBG not to be transmitted, and '1' refers to the CBG to be transmitted.

CBG flushing out information (0 or 1 bit): an indicator indicating whether the previous CBGs are contaminated, which has '0' indicating that the previous CBGs are possibly contaminated and '1' indicating that the previous CBGs are combinable for reception of retransmissions.

DMRS sequence initialization (0 or 1 bit): a DMRS scrambling ID selection indicator.

The number of pieces of DCI in different sizes that the UE is able to receive in each slot in the corresponding cell is up to four. The number of pieces of DCI in different sizes scrambled by C-RNTIs that the UE is able to receive in each slot in the corresponding cell is up to three.

Figure 9:
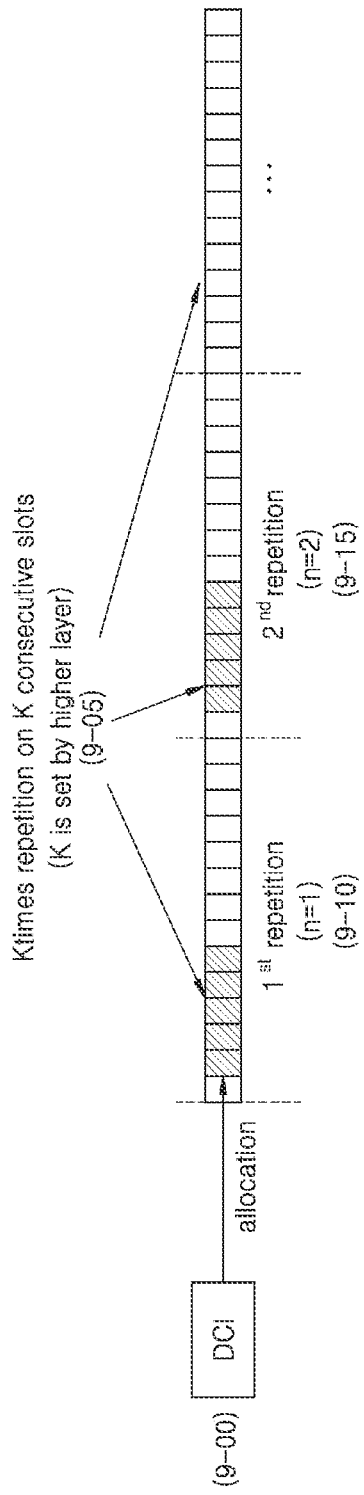
FIG. 9 shows PDSCH repetitive transmission in a wireless communication system, according to an embodiment of the disclosure.

FIG. 9 shows PDSCH repetitive transmission in a wireless communication system, according to an embodiment of the disclosure.

Referring to FIG. 9, in NR, the same PDSCH is repetitively transmitted to increase reliability in PDSCH reception of the UE, in 9-00. The BS may set the number of transmission repetitions of the PDSCH, for example, pdsch-AggregationFactor in PDSCH-Config, and when the number of transmission repetitions is set, a PDSCH scheduled in DCI may be repetitively transmitted in as many slots as the number of continuous transmission repetitions, in 9-05. All the transmission repetitions of the PDSCH may be allocated the same time resources in a slot, which may be, as shown in FIG. 7, a starting position 7-00 and length 7-05 of OFDM symbols in one slot indicated by DCI. Furthermore, the same MCS may be applied to all the transmission repetitions of the PDSCH. The UE may expect that the repetitive transmission of the PDSCH is performed in a single layer. Furthermore, an RV of the PDSCH repetitively transmitted may be determined according to an RV value indicated in DCI scheduling the PDSCH and an index of the repetitively transmitted PDSCH as in Table 7.

TABLE 7

| $rv_{id}$ indicated by the DCI | $rv_{id}$ to be applied to $n^{th}$ transmission occasion | | | |
|---|---|---|---|---|
| scheduling the PDSCH | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

In Table 7, n may indicate an index of each of a number of transmission repetitions of the PDSCH determined by an upper layer, in 9-10 and 9-15.

Figure 10:
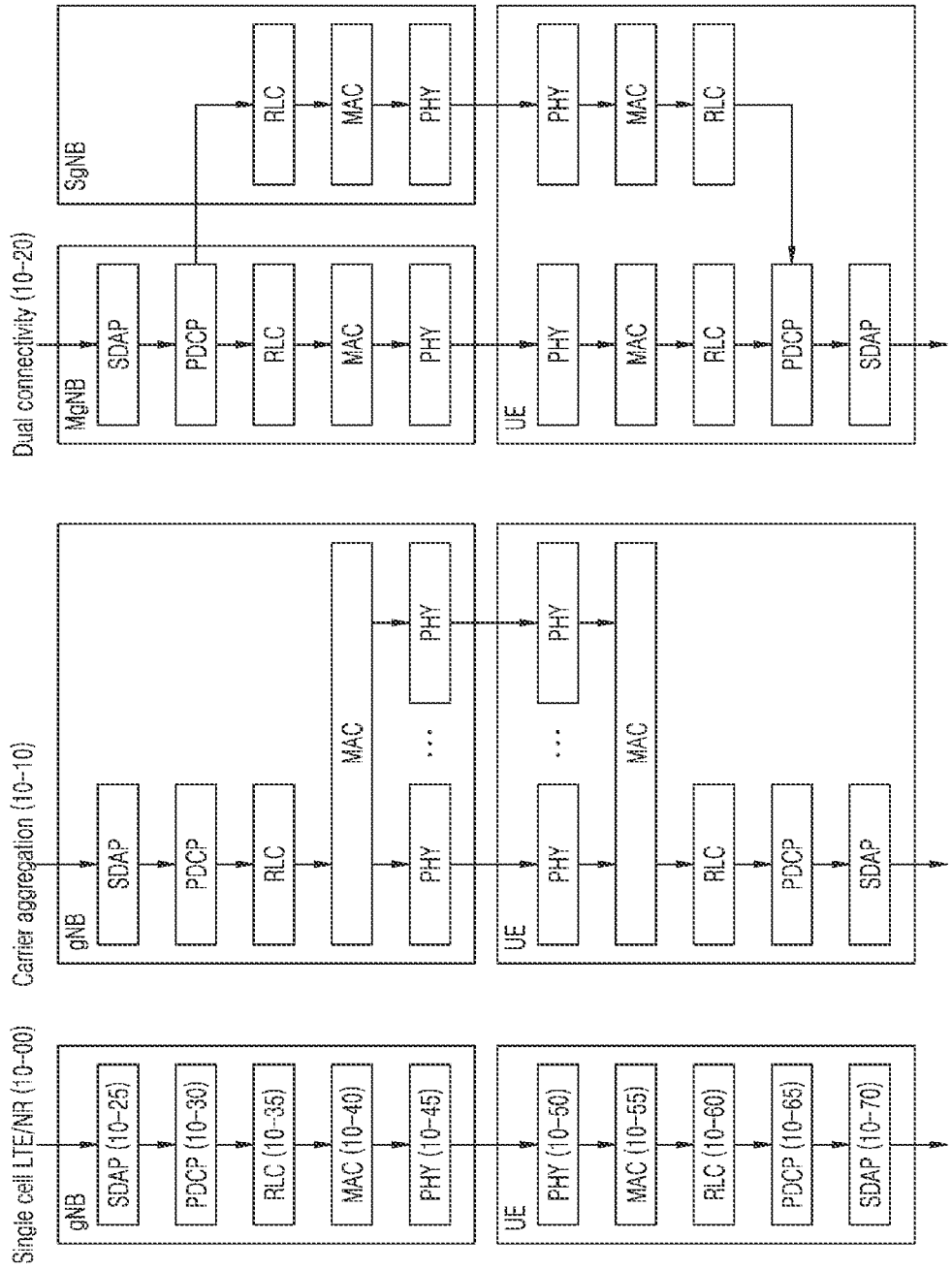
FIG. 10 shows protocol stacks of a base station (BS) and user equipment (UE) for a single cell 10-00, carrier aggregation (CA) 10-10, and dual connectivity (DC) 10-20 in a wireless communication system, according to an embodiment of the disclosure.

FIG. 10 shows protocol stacks of a BS and UE for a single cell, carrier aggregation (CA), and dual connectivity (DC) in a wireless communication system, according to an embodiment of the disclosure.

Referring to FIG. 10, a wireless protocol of a next generation mobile communication system in each of the UE and an NR BS may include an NR service data adaptation protocol (NR SDAP) 10-25 or 10-70, an NR Packet Data Convergence Protocol (NR PDCP) 10-30 or 10-65, an NR Radio Link Control (NR RLC) 10-35 or 10-60, and an NR Medium Access Control (NR MAC) 10-40 or 10-55.

Main functions of the NR SDAP 10-25 or 10-70 may include some of the following functions:
    user plane data transfer function;
    function of mapping between a quality of service (QoS) flow and a data bearer (DRB) for both DL and UL;
    function of marking QoS flow ID for both UL and DL; and
    function of mapping of a reflective QoS flow to a DRB for UL SDAP protocol data units (PDUs).

For an SDAP layer device, the UE may receive a configuration of whether to use a header of the SDAP layer device or whether to use a function of the SDAP layer device for each PDCP layer device or each bearer or each logical channel in an RRC message, and when the SDAP header is configured, a 1-bit non-access stratum (NAS) reflective QoS indicator (NAS reflective QoS) and a 1-bit access stratum (AS) reflective QoS (AS reflective QoS) may indicate for the UE to update or reconfigure the mapping information between the QoS flow and the data bearer for UL or DL. The SDAP header may include QoS flow ID information indicating QoS. The QoS flow ID information may be used for data process priority, scheduling, etc., for smoother services.

Main functions of the NR PDCP 10-30 or 10-65 may include some of the following functions:
- header compression and decompression function (e.g., header compression and decompression: ROHC only);
- user data transfer function;
- sequential delivery function (e.g., in-sequence delivery of upper layer PDUs);
- non-sequential delivery function (e.g., out-of-sequence delivery of upper layer PDUs);
- reordering function (e.g., PDCP PDU reordering for reception);
- duplicate detection function (e.g., duplicate detection of lower layer SDUs);
- retransmission function (e.g., retransmission of PDCP SDUs);
- ciphering and deciphering function; and
- timer-based SDU discard function (e.g., timer-based SDU discard in uplink).

The reordering function of the NR PDCP device may refer to a function of reordering PDCP PDUs received from a lower layer based on PDCP sequence numbers (SNs). The reordering function of the NR PDCP device may include a function of transferring data to an upper layer in the reordered sequence or transferring the data directly to the upper layer without considering the sequence. Moreover, the reordering function of the NR PDCP device may include a function of reordering the sequence to record missing PDCP PDUs, a function of reporting status of missing PDCP PDUs to a transmitting end, or a function of requesting retransmission of missing PDCP PDUs.

Main functions of the NR RLC 10-35 or 10-60 may include some of the following functions:
- data transfer function (e.g., transfer of upper layer PDUs);
- sequential delivery function (e.g., in-sequence delivery of upper layer PDUs);
- non-sequential delivery function (e.g., out-of-sequence delivery of upper layer PDUs);
- ARQ function (e.g., error correction through ARQ);
- concatenation, segmentation, and reassembling function (e.g., concatenation, segmentation and reassembly of RLC SDUs);
- re-segmentation function (e.g., re-segmentation of RLC data PDUs);
- reordering function (e.g., reordering of RLC data PDUs);
- duplicate detection function;
- error detection function (e.g., protocol error detection);
- RLC SDU discard function; and
- RLC re-establishment function.

The sequential delivery function of the NR RLC device may refer to a function of delivering RLC SDUs received from a lower layer to an upper layer in sequence. The sequential delivery function of the NR RLC device may include a function of receiving, reassembling and delivering multiple RLC SDUs resulting from segmentation of an original RLC SDU, and a function of reordering the received RLC PDUs based on RLC SNs or PDCP SNs. Furthermore, the sequential delivery function of the NR RLC device may include a function of reordering the sequence to record missing RLC PDUs, a function of reporting status of missing RLC PDUs to a transmitting end, or a function of requesting retransmission of missing PDCP PDUs. Moreover, the sequential delivery function of the NR RLC device may include, when there is a missing RLC SUD, a function of delivering RLC SDUs before the missing RLC SDU to an upper layer in sequence, or when there is a missing RLC SDU but a timer is expired, a function of delivering all RLC SDUs received before the timer starts to an upper layer in sequence, or when there is a missing RLC SDU but a timer is expired, a function of delivering all RLC SDUs received up to the present to an upper layer in sequence. Furthermore, the sequential delivery function of the NR RLC device may deliver RLC PDUs to a PDCP device regardless of the sequence (out-of-sequence delivery) by processing the RLC PDUs in the order of reception (or in the order of arrival without regard to the order of the SNs), or when the RLC PDU is segmented, reassemble the segments stored in a buffer or received into a complete RLC PDU, process and deliver the RLC PDU to a PDCP device. The NR RLC layer may not include the concatenation function, and the concatenation function may be performed in the NR MAC layer or replaced with the multiplexing function of the NR MAC layer.

The non-sequential delivery function of the NR RLC device may refer to a function of delivering RLC SDUs received from a lower layer directly to an upper layer without regard to the sequence of the RLC SDUs. The non-sequential delivery function of the NR RLC device may include a function of receiving, reassembling and delivering multiple RLC SDUs resulting from segmentation of an original RLC SDU, and a function of storing RLC SNs or PDCP SNs of the received RLC PDUs and reordering the received RLC PDUs based on the RLC SNs or PDCP SNs to record missing RLC PDUs.

The NR MAC layer 10-40 or 10-55 may be connected to multiple NR RLC layer devices configured in the same UE, and main functions of the NR MAC layer 10-40 or 10-55 may include some of the following functions:
- mapping function (e.g., mapping between logical channels and transport channels);
- multiplexing and demultiplexing function (e.g., multiplexing/demultiplexing of MAC SDUs);
- scheduling information report function;
- HARQ function (e.g., error correction through HARQ);
- logical channel priority control function (e.g., priority handling between logical channels of one UE);
- UE priority control function (e.g., priority handling between UEs by means of dynamic scheduling);
- MBMS service identification function;
- transport format selection function; and
- padding function.

The NR PHY layer 10-45 or 10-50 may perform channel coding and modulation on upper layer data, form the data into OFDM symbols and transmit them on a radio channel, or may demodulate OFDM symbols received on a radio channel, perform channel decoding on them and send the result to an upper layer.

Details of the radio protocol architecture of FIG. 10 may be variously changed according to carrier (or cell) operation schemes. For example, when the BS transmits data to the UE on a single carrier (or cell) basis, the BS and the UE use a protocol architecture having a single structure for each layer, as in 10-00. When the BS transmits data to the UE on a CA basis where a single transmission and reception point (TRP) uses multiple carriers, the BS and the UE use a protocol architecture having a single structure for each layer until the RLC layer and having the PHY layer multiplexed through the MAC layer, as in 10-10. In another example, when the BS transmits data to the UE on a DC basis where multiple TRPs use multiple carriers, the BS and the UE use a protocol architecture having a single structure for each of the SDAP and PDCP and the RLC layers multiplexed through the PDCP.

Referring to the descriptions of the DCI structure, PDSCH time/frequency resource allocation, and the repetitive PDSCH transmission procedure performed based on the DCI structure and PDSCH time/frequency resource allocation, NR uses a single transmission point/panel/beam in PDSCH repetitive transmission in the release 15. Application of cooperative communication using multiple transmission points/panels/beams in PDSCH repetitive transmission may attain more robust performance for e.g., channel blockage, but it requires an additional standard to be supported. Furthermore, in NR of the current release 15, multiple continuous slots are used in the PDSCH repetitive transmission, which means long latency required for reception and decoding of the PDSCH. When a PDSCH to be repetitively transmitted using the cooperative communication is transmitted at multiple transmission points/panels/beams, the latency may be reduced but an additional standard for this is required to be supported. Accordingly, the disclosure provides a method of attaining improvement of reliability and reduction of latency in PDSCH repetitive transmission using cooperative communication.

Embodiments of the disclosure will be described in conjunction with accompanying drawings. When determined as making the subject matter of the disclosure unclear, the detailed description of related functions or structures in describing the disclosure may be skipped. Further, the terms as will be mentioned later, are defined by taking functionalities as will be described in the disclosure into account, but may vary depending on certain practices or intentions of users or operators. Accordingly, the terms should be defined based on the descriptions throughout this specification.

In the following description, a BS is an entity for performing resource allocation for a terminal, and may be at least one of a gNB, an eNB, a Node B, a radio access unit, a base station controller, or a network node. A terminal may include UE, an MS, a cellular phone, a smart phone, a computer, or a multimedia system capable of communication. Although the following embodiments of the disclosure will now be focused on an NR, LTE, or LTE-A system for example, they may be equally applied to other communication systems with similar technical backgrounds or channel types. Furthermore, embodiments of the disclosure will also be applied to other communication systems with some modifications to such an extent that does not significantly deviate from the scope of the disclosure when judged by those of ordinary skill in the art.

The disclosure may be applied to frequency division duplex (FDD) and time division duplex (TDD) systems.

In the following description, upper layer signaling is a method of transferring a signal to the UE from the BS on a downlink data channel of the PHY layer or to the BS from the UE on an uplink data channel of the PHY layer, and may also be referred to as RRC signaling, PDCP signaling, or an MAC CE.

The UE may determine whether to apply the cooperative communication in various ways, by e.g., having PDCCH(s) that allocates a PDSCH, to which the cooperative communication is applied, have a particular format, having PDCCH(s) that allocates a PDSCH, to which the cooperative communication is applied, include a particular indicator to indicate whether the cooperative communication is applied, having PDCCH(s) that allocates a PDSCH, to which the cooperative communication is applied, scrambled by a particular RNTI, or assuming application of the cooperative communication in a particular section indicated by an upper layer. Hereinafter, for convenience of explanation, an instance when the UE receives a PDSCH, to which the cooperative communication is applied, based on conditions similar to the aforementioned conditions may be referred to as a non-coherent (NC) joint transmission (JT) case.

Determining priority between A and B may mean various examples such as selecting one of A and B that has higher priority according to a preset priority rule and performing a corresponding operation or omitting or dropping an operation for the other one that has lower priority.

The above examples will now be described with several embodiments, in which case one or more embodiments may be applied simultaneously or in combination rather than separately.

First Embodiment: DCI Reception for NC-JT

Unlike the existing communication system, 5G wireless communication systems may support not only services requiring higher transmission speed but also both services having very short latency and services requiring a higher connection density. In a wireless communication network including multiple cells, TRPs, or beams, cooperative communication between the respective cells, TRPs and/or beams is one of key technologies that may satisfy various service requirements by increasing strength of a signal received by the UE or efficiently performing interference control between the respective cells, TRPs and/or beams. According to an embodiment of the disclosure, the cooperative communication may also be called coordinated transmission.

Joint transmission (JT) is a representative transmission technology for cooperative communication, which may support a UE with different cells, TRPs, and/or beams to increase the strength of a signal received by the UE. In the meantime, as channels between the respective cells, TRPs and/or beams and the UE may have significantly different characteristics, different precoding, MCS, resource allocation, etc., needs to be applied to each link between each cell, TRP and/or beam and the UE. Especially, in the case of NC JT that supports non-coherent precoding between the respective cells, TRPs and/or beams, individual DL transmission information configuration for the respective cells, TRPs and/or beams may become important. The individual DL transmission information configuration for the respective cells, TRPs and/or beams may be a main cause of increasing the payload required for DL DCI transmission, which may have a bad influence on reception performance of a PDCCH that transmits the DCI. Hence, to support JT, it is needed to take into account a tradeoff between an amount of DCI information and PDCCH reception performance.

Figure 11:
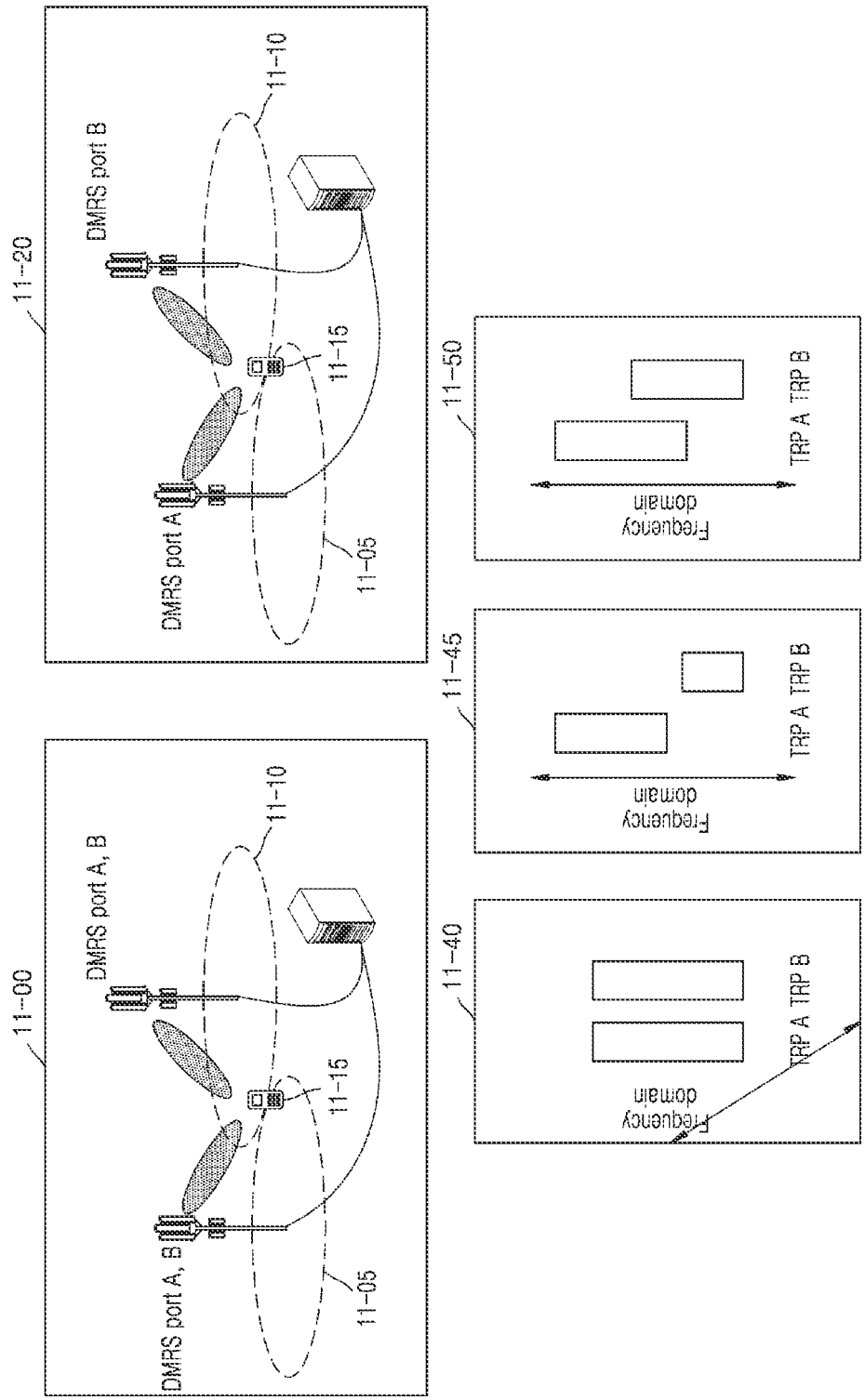
FIG. 11 shows antenna port configurations and resource allocations for cooperative communication in a wireless communication system, according to an embodiment of the disclosure.

FIG. 11 shows antenna port configurations and resource allocations for cooperative communication in a wireless communication system, according to an embodiment of the disclosure.

Referring to FIG. 11, coherent JT (C-JT) that supports coherent precoding between respective cells, TRPs and/or beams is shown in 11-00. In C-JT, single data (e.g., a PDSCH) may be transmitted from TRP A 11-05 and TRP B 11-10, and joint precoding may be performed at multiple TRPs. This means that the same PDSCH may be transmitted to the same DMRS ports (e.g., DMRS port A, B at both TRPs) from TRP A 11-05 and TRP B 11-10. In this case, the UE 11-15 may receive a piece of DCI information to receive a PDSCH demodulated by the DMRS port A, B.

In FIG. 11, NC-JT that supports non-coherent precoding between the respective cells, TRPs and/or beams is shown in 11-20. In the case of NC-JT, a PDSCH may be transmitted for each cell, TRP and/or beam, and individual precoding may be applied to each PDSCH. As the respective cells, TRPs and/or beams transmit different PDSCHs, throughput may be improved as compared with the single cell, TRP and/or beam transmission, or as the respective cells, TRPs and/or beams transmit the same PDSCH repetitively, reliability may be improved as compared with the single cell, TRP and/or beam transmission.

Various radio resource allocations such as an occasion when frequency and time resources used at the multiple TRPs for PDSCH transmission are the same in 11-40, an occasion when frequency and time resources used at the multiple TRPs do not overlap each other at all in 11-45, and an occasion when some of the frequency and time resources used at the multiple TRPs overlap each other in 11-50 may be considered. In a case that the same PDSCH are repetitively transmitted from multiple TRPs for improvement of reliability on each of the above occasions for radio resource allocation, when the UE does not know of whether the PDSCH is repetitively transmitted, the improvement of reliability may be restricted because the UE may not perform combining on the PHY layer for the PDSCH. Hence, the disclosure provides how to indicate and configure repetitive transmission to improve reliability in NC-JT transmission.

To simultaneously allocate multiple PDSCHs to a UE to support NC-JT, various forms, structures and relations of DCI may be considered.

Figure 12:
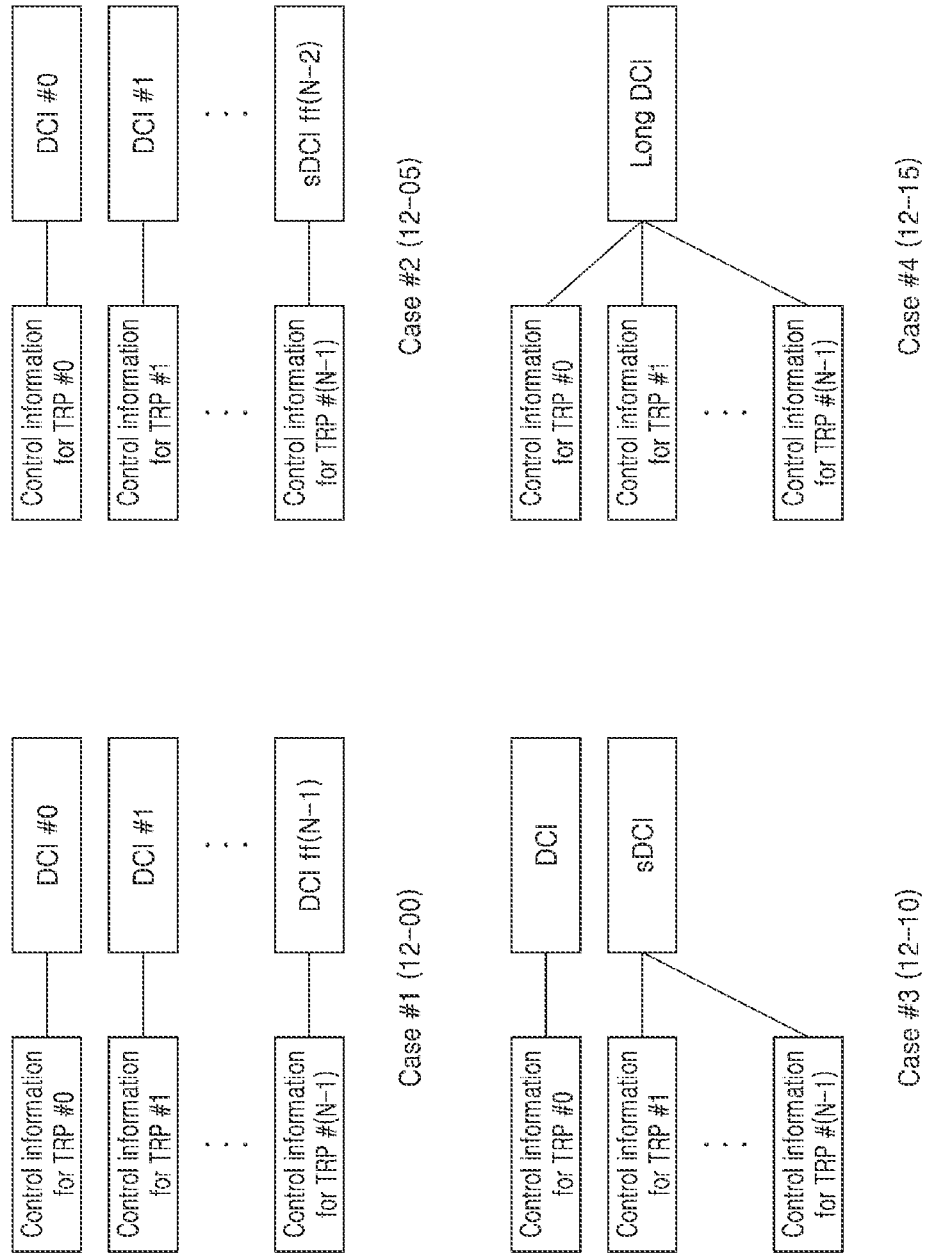
FIG. 12 shows configurations of downlink control information (DCI) for cooperative communication in a wireless communication system, according to an embodiment of the disclosure.

FIG. 12 shows configurations of DCI for cooperative communication in a wireless communication system, according to an embodiment of the disclosure.

Specifically, FIG. 12 shows four cases of DCI designs for support of NC-JT.

Referring to FIG. 12, case #1 12-00 shows an instance when N-1 different PDSCHs are transmitted from additional N-1 TRPs, TRP #1 to TRP #(N-1) in addition to transmission of a PDSCH from a serving TRP, TRP #0, in which case control information for the PDSCHs transmitted from the additional TRPs is transmitted in the same DCI format as for the PDSCH transmitted from the serving TRP. Specifically, the UE may obtain the control information for the PDSCHs transmitted from different TRPs, TRP #0 to TRP #(N-1), through DCI, DCI #0 to DCI #(N-1) all having the same DCI format and the same payload. In case #1, degrees of freedom of each PDSCH control (allocation) is fully secured, but when each DCI is transmitted from a different TRP, the reception performance may be degraded due to a coverage difference for each DCI.

In FIG. 12, case #2 12-05 shows an instance when N-1 different PDSCHs are transmitted from additional N-1 TRPs, TRP #1 to TRP #(N-1) in addition to transmission of a PDSCH from a serving TRP, TRP #0, in which case control information for the PDSCHs transmitted from the additional TRPs is transmitted in different DCI formats or different DCI payloads as for the PDSCH transmitted from the serving TRP. For example, DCI #0 carrying the control information for the PDSCH transmitted from the serving TRP, TRP #0, may include all information elements of DCI format 1_0 to DCI format 1_1, but 'shortened' DCI (sDCI #0 to sDCI #(N-2)) carrying the control information for the PDSCHs transmitted from the cooperative TRPs, TRP #1 to TRP #(N-1), may include only some of the information elements of DCI format 1_0 to DCI format 1_1. Accordingly, the sDCI carrying the control information for the PDSCHs transmitted from the cooperative TRPs may have a payload smaller than that of normal DCI (nDCI) or include as many reserved bits as the number of lacking bits as compared to the nDCI. In case #2, each PDSCH control (allocation) degree of freedom may be limited according to content of the information element included in the sDCI, but a probability of having coverage difference for each DCI may be reduced because reception performance of the sDCI is better than that of the nDCI.

In FIG. 12, case #3 12-10 shows another occasion when N-1 different PDSCHs are transmitted from additional N-1 TRPs, TRP #1 to TRP #(N-1) in addition to transmission of a PDSCH from a serving TRP, TRP #0, in which case control information for the PDSCHs transmitted from the additional TRPs is transmitted in different DCI formats or different DCI payloads from that for the PDSCH transmitted from the serving TRP. For example, DCI #0 carrying the control information for the PDSCH transmitted from the serving TRP, TRP #0, may include all information elements of DCI format 1_0 to DCI format 1_1, and control information for the PDSCHs transmitted from the cooperative TRPs, TRP #1 to TRP AN-1), may be carried in such a way that only some of the information elements of DCI format 1_0 to DCI format 1_1 are collected and carried in a piece of 'secondary' DCI (sDCI). For example, the sDCI may include at least one piece of information of frequency domain resource allocation, time domain resource allocation, or HARQ-related information such as an MCS for the cooperative TRPs. Information that is not included in the sDCI, such as a BWP indicator or a carrier indicator, may follow the DCI of the serving TRP, i.e., DCI #0, or a normal DCI, nDCI. In case #3, each PDSCH control (allocation) degree of freedom may be limited according to content of the information element included in the sDCI, but reception performance of the sDCI may be controlled and the complexity of DCI blind decoding of the UE is reduced as compared with the case #1 or case #2.

In FIG. 12, case #4 12-15 shows an instance when N-1 different PDSCHs are transmitted from additional N-1 TRPs, TRP #1 to TRP AN-1) in addition to transmission of a PDSCH from a serving TRP, TRP #0, in which case control information for the PDSCHs transmitted from the additional TRPs is transmitted in the same DCI, long DCI or 1DCI, as for the PDSCH transmitted from the serving TRP. In this case, the UE obtains the control information for the PDSCHs transmitted from the different TRPs, TRP #0 to TRP AN-1) in single DCI. In case #4, DCI blind decoding complexity in the UE does not increase, but PDSCH control (allocation) degrees of freedom are reduced such as the number of cooperative TRPs being limited due to limitations on the long DCI payload.

In the following description and embodiments of the disclosure, sDCI may refer to various types of auxiliary DCI such as shortened DCI, secondary DCI, or normal DCI (having the aforementioned DCI formats 1_0 to 1_1) carrying control information of a PDSCH transmitted from a cooperative TRP, the description of which may be similarly applied to various types of auxiliary DCI unless otherwise specified.

In the following description and embodiments of the disclosure, the above cases #1, #2, and #3 in which one or more DCI (PDCCHs) are used to support NC-JT are classified as multiple-PDCCH-based NC-JT, and the case #4 in which single DCI (a PDCCH) is used to support NC-JT is classified as single-PDCCH-based NC-JT.

In embodiments of the disclosure, the term "cooperative TRP" may be replaced with various terms including a "cooperative panel" or a "cooperative beam" when actually used.

In embodiments of the disclosure, the expression that 'NC-JT is applied' is used herein for convenience of explanation, but it may be variously interpreted to fit the context, such as 'the UE simultaneously receives one or more PDSCHs in one BWP', 'the UE simultaneously receives PDSCHs based on two or more TCI indication in one BWP', 'a PDSCH received by the UE is associated with one or more DMRS port group', etc.

In the disclosure, a radio protocol architecture for NC-JT may be variously used depending on TRP development scenarios. For example, when there is no or little backhaul latency between cooperative TRPs, a structure based on MAC layer multiplexing similar to what is shown in 9-10 of FIG. 9 may be used (CA-like method). On the other hand, when there is big backhaul latency between cooperative TRPs (e.g., when 2 ms or more time is required for CSI exchange or scheduling information exchange between the cooperative TRPs), a separate structure for each TRP from the RLC layer may be used to secure robustness of the latency (DC-like method).

Second Embodiment: Method of Configuring NC-JT Repetitive Transmission

In this embodiment of the disclosure, a detailed configuration and indication method is provided for two or more TRPs to repetitively transmit the same PDSCH in the same transmission band, e.g., a component carrier, a BWP, etc., as described above in the first embodiment of the disclosure.

Figure 13A:
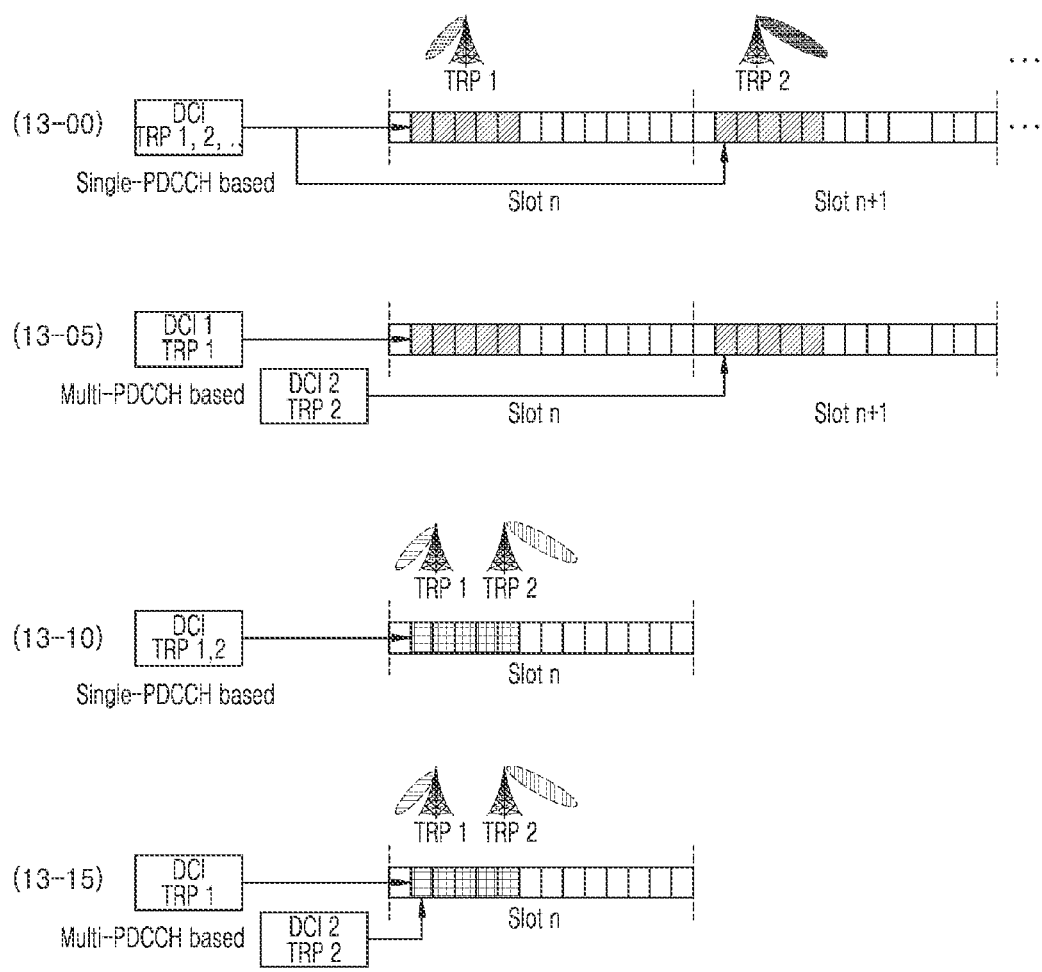
FIGS. 13A and 13B show repetitive transmission of multiple transmission and reception points (TRPs), to which various resource allocation methods are applied, in a wireless communication system, according to various embodiments of the disclosure.
Figure 13B:
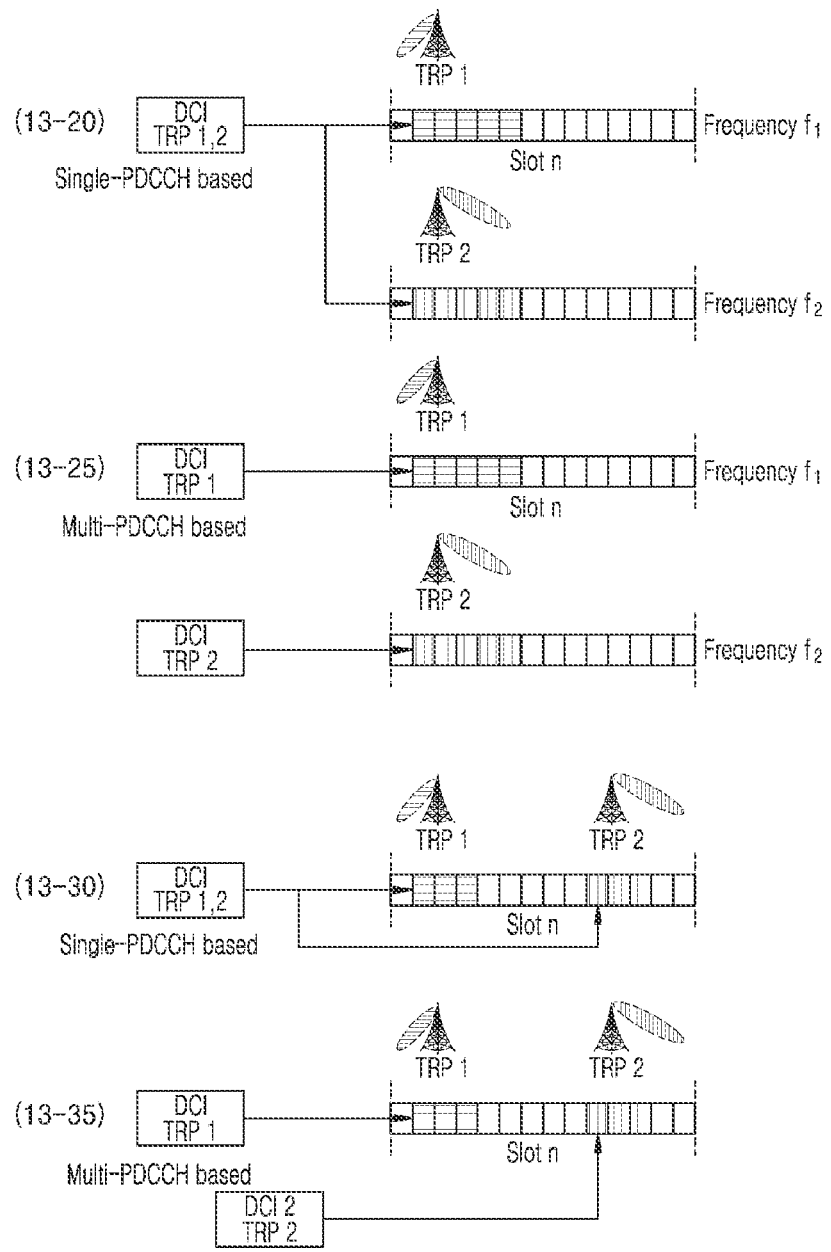

FIGS. 13A and 13B show repetitive transmission of multiple TRPs for which various resource allocation methods are used in a wireless communication system, according to various embodiments of the disclosure.

That is, FIGS. 13A and 13B show an occasion when two or more TRPs transmit the same PDSCH repetitively.

In current NR, as many slots as repetitive transmission times are required to repetitively transmit the same PDSCH as described above, and the same cell, TRP and/or beam is used in each repetitive transmission. On the other hand, referring to FIGS. 13A and 13B, in the embodiment of the disclosure, different TRPs are used for repetitive transmission in each slot, to attain higher reliability in 13-00 and 13-05. In the meantime, different repetitive transmission methods may be used depending on the UE's capabilities, latency requirements, available resource conditions between TRPs, etc. For example, when the UE has a capability of NC-JT reception, each TRP may use a method of transmitting the same PDSCH in the same time and frequency resources, thereby increasing the rate of frequency resource use and reducing latency required for PDSCH decoding in 13-10 and 13-15. The method is efficient when there is little beam interference between the TRPs involved in the simultaneous transmission because the beams are nearly orthogonal to each other. In another embodiment of the disclosure, each TRP may use a method of transmitting the same PDSCH in the same time and non-overlapping frequency resources, in 13-20 and 13-25. The method is efficient when there is large beam interference between the TRPs involved in the simultaneous transmission and each TRP has many available frequency resources. In yet another embodiment of the disclosure, each TRP may use a method of transmitting the same PDSCH in different OFDM symbols in the same slot, in 13-30 and 13-35. The method is efficient when each TRP does not have many available frequency resources and the size of data to be transmitted is small. In addition, modifications based on the above methods may be possible.

In the above methods, single DCI may be used to schedule repetitive transmission in 13-00, 13-10, 13-20, and 13-30, and the DCI may indicate a list of all TRPs to be involved in the repetitive transmission. The list of TRPs that perform repetitive transmission may be indicated in the form of a TCI state list, and the length of the TCI state list may be dynamically changed. The DCI may be repetitively transmitted to increase reliability, and a different beam may be used for each DCI in the repetitive transmission. Alternatively, multiple pieces of DCI may be used to schedule repetitive transmission in 13-05, 13-15, 13-25, and 13-35, and each piece of DCI may correspond to a PDSCH of a different TRP to be involved in the repetitive transmission. A TRP for each DCI may be indicated in the form of a TCI state. Alternatively, shortened DCI may be used to schedule repetitive transmission, and each of the normal DCI and the secondary DCI may correspond to a PDSCH of a different TRP to be involved in the repetitive transmission. The aforementioned indication method may be commonly applied to both the repetitive transmission through multiple TRPs and the different data transmission through multiple TRPs.

In single/multiple/shortened DCI-based NC-JT transmission, when the UE does not know of whether the PDSCH transmitted from each TRP is a repetition or different data, each PDSCH may be separately decoded, and even when the PDSCH transmitted is a repetition, the UE may not be able to perform combining PDSCHs, thereby failing to gain performance benefits. As a method of determining whether repetitive transmission occurs, the following examples may be considered.

A. Method 1: When a particular MCS table is set up in an upper layer, e.g., when the table is set up with e.g., qam64LowSE having low spectral efficiency, the UE assumes that each PDSCH transmitted by NC-JT carries the same data, and otherwise, the UE assumes that each PDSCH transmitted by NC-JT carries different data.

B. Method 2: When one or all DCI for NC-JT transmission is scrambled by a particular RNTI, e.g., when the DCI is scrambled by an MCS-C-RNTI, the UE assumes that each PDSCH transmitted by NC-JT carries the same data, and otherwise, the UE assumes that each PDSCH transmitted by NC-JT carries different data.

C. Method 3: When an MCS level indicated in one or all DCI for NC-JT transmission is lower than a particular threshold, the UE assumes that each PDSCH transmitted by NC-JT carries the same data, and otherwise, the UE assumes that each PDSCH transmitted by NC-JT carries different data.

D. Method 4: When the number of DMRS ports, CDM groups or layers indicated in one DCI for NC-JT transmission is one, the UE assumes that each PDSCH transmitted by NC-JT carries the same data, and otherwise, the UE assumes that each PDSCH transmitted by NC-JT carries different data.

E. Method 5: When HARQ process numbers and NDI values indicated in all DCI for NC-JT transmission are the same, the UE assumes that each PDSCH transmitted by NC-JT carries the same data, and otherwise, the UE assumes that each PDSCH transmitted by NC-JT carries different data. In current NR, there is a restriction that the UE does not expect reception of a PDSCH designated by a particular HARQ process ID until ACK of the PDSCH is transmitted, except for the retransmission. The restriction may be replaced by a restriction that the UE does not expect to receive a PDSCH designated by a particular TCI state in addition to the particular HARQ process ID until ACK of the PDSCH is transmitted. Hence, repetitive data transmission between different TRPs is allowed while one TRP has the same restriction as before.

The above examples may be operated in combination of two or more of the examples, and apart from the examples, similar methods of determining whether a PDSCH transmitted by NC-JT is repetitively transmitted may be used.

In the meantime, in current NR, the number of transmission repetitions (or repetitive transmission times) is semi-statically set. However, a required level of reliability may be satisfied without repetitive transmission or with fewer repetition times than the set number of times according to a change in e.g., channel condition. Accordingly, the number of transmission repetitions may be dynamically set to increase transmission efficiency. For example, when the repetitive transmission is scheduled in single DCI, the number of transmission repetitions may be equal or proportional to the number of TCI states indicated in the DCI. A value of x may be set dynamically or semi-statically, and may be equal to a value designated as the number of transmission repetitions in NR when it is set semi-statically.

When the number of transmission repetitions is larger than the number of TCI states, the TCI states may follow a particular pattern when they are applied to each repetitive slot. For example, when the number of transmission repetitions is four and TCI state indexes 1 and 2 are indicated, the TCI states may be applied in each transmission slot in the pattern of 1, 2, 1, 2 or 1, 1, 2, 2.

Alternatively, the number of transmission repetitions, which is set semi-statically, may be the maximum number of transmission repetitions, and the actual number of transmission repetitions may be indicated dynamically in e.g., DCI/MAC-CE. When the number of transmission repetitions is indicated in DCI, the number may be indicated in a new field or indicated by re-defining an existing field. For example, when a single transmission layer is only used for repetitive transmission, codepoine indicating multiple DMRS ports in an antenna port field of the DCI is not used, so it may be re-defined to indicate the actual number of transmission repetitions. In another example, the number of transmission repetitions may be set to a value equal or proportional to the number of TCI states indicated in DCI/MAC-CE. In yet another example, the number of transmission repetitions may be indicated in a time domain resource allocation field indicated in DCI. For example, the number of transmission repetitions may be indicated along with a value indicated in current NR, e.g., a value of $K_0$, S, L or the like as described above in connection with FIG. 8 by being added to the value in a time domain resource allocation field of DCI. In the meantime, when the repetitive transmission is scheduled in multiple pieces of DCI, the number of transmission repetitions may be x, which is equal or proportional to the number of pieces of DCI that schedules the repetitive transmission, and x may have a value as described above. When the number of transmission repetitions is indicated both semi-statically and dynamically, there may be an order of priority between them. For example, the number of transmission repetitions indicated dynamically may take priority over the number of transmission repetitions indicated semi-statically.

Third Embodiment: Method of Configuring Repetitive Transmission for Each Slot Using Multiple TRPs This embodiment of the disclosure provides various specific methods for supporting repetitive transmission for each slot using multiple TRPs.

First, when the number of transmission repetitions for each slot is set in an upper layer, e.g., when pdsch-AggregationFactor is set in the PDSCH-Config, and when multiple TRPs are indicated in multiple TCI states in DCI scheduling PDSCHs, the UE may receive the PDSCHs by applying the respective TCI states to different slots. In this case, there may be one DCI that schedules the PDSCHs. In the meantime, in NR, considering a time required to decode the DCI, the operation of applying a TCI state to a PDSCH reception point in time may be different depending on each condition, as described above in connection with FIG. 14.

Figure 14:
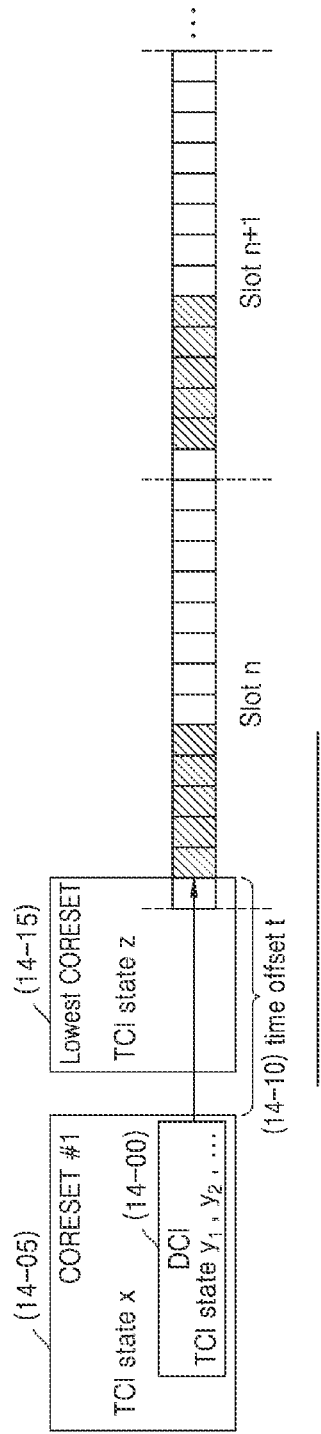
FIG. 14 shows application of transmission configuration indicator (TCI) states in repetitive transmission for each slot of multiple TRPs in a wireless communication system, according to an embodiment of the disclosure.

FIG. 14 shows application of transmission configuration indicator (TCI) states in repetitive transmission for each slot of multiple TRPs in a wireless communication system, according to an embodiment of the disclosure.

Condition 1. When DCI 14-00 that schedules the PDSCH indicates one or multiple TCI states and time offset 14-10 between DCI and PDSCH reception points of time is equal to or larger than a particular threshold, the PDSCH may be received in the TCI state indicated in the DCI.

Condition 2. When the DCI 14-00 that schedules the PDSCH indicates no TCI state and the time offset 14-10 between DCI and PDSCH reception points of time is equal to or larger than the particular threshold, the PDSCH may be received in a TCI state mapped to a CORESET 14-05 to which the DCI belongs.

Condition 3. When the time offset 14-10 between DCI and PDSCH reception points of time is less than the particular threshold, the PDSCH may be received in a TCI state mapped to a lowest CORESET 14-15 monitored at the time of PDSCH reception.

Hence, a method of applying a TCI state for each of the above conditions is required in repetitive transmission for each slot using multiple TRPs. For example, multiple TCI states indicated in the DCI may be applied for each slot according to one of the following rules.

Rule 1. Sequentially apply the respective TCI states indicated to all repetitive transmission slots. However, for the slot to which the condition 3 is applied, the indicated TCI state is ignored.

Rule 2. Sequentially apply the respective TCI states indicated to repetitive transmission slots that satisfy the condition 1.

When the number of repetitive transmission slots is greater than the number of TCI states that are indicated, the TCI states may follow a particular pattern when they are applied to each repetitive slot. For example, when the number of repetitive transmission slots is four and TCI state indexes 1 and 2 are indicated, the TCI states may be applied to each transmission slot in the pattern of 1, 2, 1, 2 or 1, 1, 2, 2. The pattern may be applied to the rule 1 or rule 2.

When the condition 2 or condition 3 is applied to some of the repetitive transmission slots, a single TCI state that is the same as before may be applied to all the corresponding repetitive transmission slots, or multiple TCI states may be commonly applied to all CORESETs or each applied to each CORESET. When multiple TCI states are applied to the repetitive transmission slots, the above rules and TCI state pattern may be similarly applied.

In current NR, the same MCS is applied to repetitive transmission for each slot. However, there may be a big change in channel between the respective TRPs and the UE in the repetitive transmission for each slot using multiple TRPs, so a different MCS needs to be configured for each TRP. In a method for this, for example, an MCS of a second TRP may be set in an MCS field for the second codeword of the DCI. As current NR assumes transmission on a single layer in the repetitive transmission for each slot, the maximum number of codewords set in an upper layer may be one. Accordingly, when the repetitive transmission for each slot is configured and the maximum number of codewords set in an upper layer is two, and when two or more TCI states are indicated in a single DCI, the UE may interpret the MCS field for the second codeword as an MCS of the second TRP. In this case, an MCS value and an RV value for the second codeword may not be set to values that disable the second codeword, e.g., MCS=6 and RV=1.

In current NR, the number of symbols and positions of the symbols are the same in repetitive transmission for each slot. However, traffic conditions and available resources for the respective TRPs may be different in the repetitive transmission for each slot using multiple TRPs, so it may be useful to differently configure the number of symbols and the position of the symbol for each TRP. In a method for this, the aforementioned time domain resource allocation field of the DCI may be set to have a different value for each TRP. For example, a resource allocation table mapped to each codepoint of the time domain resource allocation field of the DCI may be separately configured for each TCI state in an upper layer. Alternatively, the time domain resource allocation field of the DCI may be separately set for each TRP. In this case, the number of TRPs or TCI states indicated in the DCI may be dynamically changed, in which case when the number of time domain resource allocation fields is also dynamically set, blind decoding is required due to the dynamic change in DCI size. Accordingly, the number of time domain resource allocation fields may be fixed to the number of transmission repetitions semi-statically set or the maximum number of TCI states that may be indicated in the DCI. A slot offset $K_0$ 7-10 and/or a PDSCH mapping type in the time domain resource allocation field may be applied for the first TRP and ignored for the remaining TRPs. Alternatively, the resource allocation table configured in all the time domain resource allocation fields/upper layer may be configured with common $K_0$ and/or a PDSCH mapping type.

Figure 15:
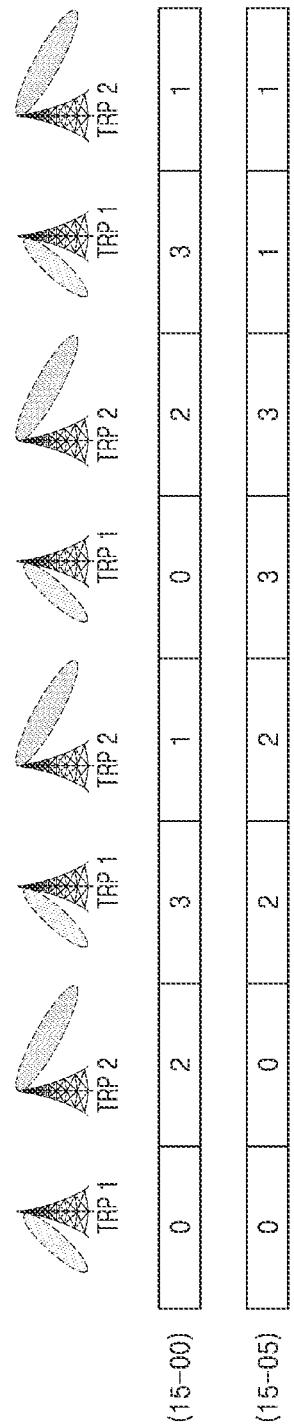
FIG. 15 shows redundancy version (RV) configurations in repetitive transmission for each slot of multiple TRPs in a wireless communication system, according to an embodiment of the disclosure.

FIG. 15 shows RV configurations in repetitive transmission for each slot of multiple TRPs in a wireless communication system, according to an embodiment of the disclosure.

Referring to FIG. 15, in current NR, RV values according to Table 7 may be used in repetitive transmission for each slot. When the RV values are applied intact and multiple TRPs (e.g., two TRPs in FIG. 15) transmit in alternate slots, the two TRPs may use different RV values, in 15-00. In the case that the RV values are applied intact and the two TRPs transmit in alternate slots, when the two TRPs use the same RVs in 15-05, the UE may perform soft combining between PDSCHs that use the same RV value. Performing the soft combining may further increase reception reliability when there is a significant channel change between the respective TRPs and the UE. In order for different TRPs to use the same RV as described above, the expression n mod 4=i, i=0, 1, 2, 3 in Table 7 may be re-defined, e.g., as $\left\lfloor \frac{n}{\text{index of TRP transmitting at } n} \right\rfloor \bmod 4 =$ $i$ or $\left\lfloor \frac{n}{\text{index of TCI state applied at } n} \right\rfloor \bmod 4 = i.$ Alternatively, n may be redefined to be, e.g., 'transmission occasion by a TRP' or 'with respect to a TCI state' rather than 'transmission occasion'.

The above examples may be operated in combination of two or more of the examples, and although repetitive transmission for each slot is described in this embodiment of the disclosure for convenience of explanation, the embodiment of the disclosure may be similarly applied to other repetitive transmission configuration methods, e.g., a method of performing repetitive transmission in different OFDM symbols in a slot in 13-30 or 13-35 or a method of performing repetitive transmission in non-overlapping frequency resources in 13-20 or 13-25.

Figure 16:
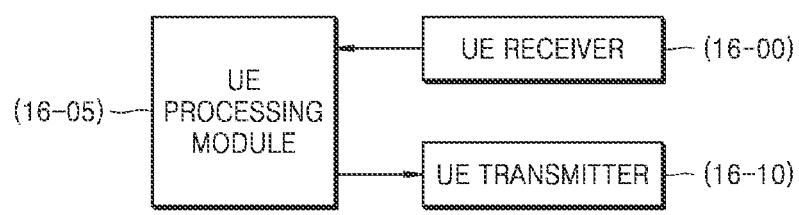
FIG. 16 is a block diagram of UE in a wireless communication system, according to an embodiment of the disclosure.

FIG. 16 is a block diagram of UE in a wireless communication system, according to an embodiment of the disclosure.

Referring to FIG. 16, the UE may include a transceiver 16-00 and 16-10, and a processing module 16-05 including a memory and a processor. The transceiver 16-00 and 16-10 and the processing module 16-05 may operate according to the aforementioned communication methods of the UE. Components of the UE are not, however, limited thereto. For example, the UE may include more or fewer elements than described above. In addition, the transceiver 16-00 and 16-10 and the processing module 16-05 may be implemented in a single chip.

The transceiver 16-00 and 16-10 may transmit or receive signals to or from a BS. The signals may include control information and data. For this, the transceiver 16-00 and 16-10 may include an RF transmitter for up-converting the frequency of a signal to be transmitted and amplifying the signal and an RF receiver for low-noise amplifying a received signal and down-converting the frequency of the received signal. However, this is just an example of the transceiver 16-00 and 16-10, and the elements of the transceiver 16-00 and 16-10 are not limited to the RF transmitter and RF receiver.

In addition, the transceiver 16-00 and 16-10 may receive a signal on a wireless channel and output the signal to the processing module 16-05, or transmit a signal output from the processing module 16-05 on a wireless channel.

The processing module 16-05 may store a program and data required for an operation of the UE. Furthermore, the processing module 16-05 may store control information or data included in a signal obtained by the UE. The memory of the processing module 16-05 may include a storage medium such as read only memory (ROM), random access memory (RAM), a hard disk, a compact disk ROM (CD-ROM), a digital versatile disc (DVD), or a combination of these storage mediums.

The processing module 16-05 may control a series of processes for the UE to be operated according to the embodiments of the disclosure. In some embodiments of the disclosure, the processing module 16-05 may control the components of the UE so that the UE receives DCI including two layers to receive multiple PDSCHs at the same time.

Figure 17:
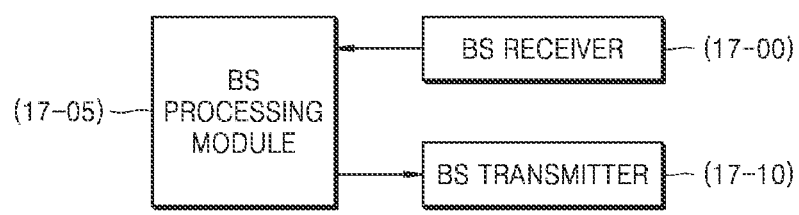
FIG. 17 is a block diagram of a BS in a wireless communication system, according to an embodiment of the disclosure.

FIG. 17 is a block diagram of a BS in a wireless communication system, according to an embodiment of the disclosure.

Referring to FIG. 17, a BS may include a transceiver 17-00 and 17-10, and a processing module 17-05 including a memory and a processor. The transceiver 17-00 and 17-10 and the processing module 17-05 may operate according to the aforementioned communication methods of the BS. Components of the BS are not, however, limited thereto. For example, the BS may include more or fewer elements than described above. In addition, the transceiver 17-00 and 17-10 and the processing module 17-05 may be implemented in a single chip.

The transceiver 17-00 and 17-10 may transmit or receive signals to or from UE. The signals may include control information and data. For this, the transceiver 17-00 and 17-10 may include an RF transmitter for up-converting the frequency of a signal to be transmitted and amplifying the signal and an RF receiver for low-noise amplifying a received signal and down-converting the frequency of the received signal. However, this is just an example of the transceiver 17-00 and 17-10, and the elements of the transceiver 17-00 and 17-10 are not limited to the RF transmitter and RF receiver.

In addition, the transceiver 17-00 and 17-10 may receive a signal on a wireless channel and output the signal to the processing module 17-05, or transmit a signal output from the processing module 17-05 on a wireless channel.

The processing module 17-05 may store a program and data required for an operation of the BS. Furthermore, the processing module 17-05 may store control information or data included in a signal obtained by the BS. The memory of the processing module 17-05 may include a storage medium such as ROM, RAM, a hard disk, a CD-ROM, a DVD, or a combination of these storage mediums.

The processing module 17-05 may control a series of processes for the BS to be operated according to the embodiments of the disclosure. In some embodiments of the disclosure, the processing module 17-05 may control the components of the BS to configure and transmit pieces of DCI of two layers, which include allocation information for multiple PDSCHs.

The methods according to the claims of the disclosure or the embodiments of the disclosure described in the specification may be implemented in hardware, software, or a combination of hardware and software.

When implemented in software, a non-transitory computer-readable storage medium storing one or more programs (software modules) may be provided. The one or more programs stored in the non-transitory computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a RAM, a non-volatile memory including a flash memory, a ROM, an electrically erasable programmable ROM (EEPROM), a magnetic disc storage device, a CD-ROM, a DVD or other types of optical storage device, and/or a magnetic cassette. Alternatively, the programs may be stored in a memory in a combination of some or all of them. The memory may be provided in a multiple number.

The program may also be stored in an attachable storage device that may be accessed over a communication network including the Internet, an intranet, a Local Area Network (LAN), a wide LAN (WLAN), a storage area network (SAN), or a combination thereof. The storage device may be connected to an apparatus performing the embodiments of the disclosure through an external port. In addition, a separate storage device in the communication network may be connected to the apparatus performing the embodiments of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Furthermore, the embodiments of the disclosure may be operated by being combined with one another, when necessary. For example, an embodiment of the disclosure and some other embodiment of the disclosure may be combined to operate the BS and the UE. For example, an embodiment of the disclosure and some other embodiment of the disclosure may be combined to operate the BS and the UE. Although the embodiments of the disclosure are provided with respect to an FDD LTE system, modifications of the embodiments of the disclosure based on the technical idea of the above embodiments of the disclosure may also be employed by other systems such as a TDD LTE system, a 5G or NR system, etc.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a terminal in a wireless communication system, the method comprising:
  receiving, from at least one of transmission and reception points (TRPs), downlink control information (DCI) including first information on transmission configuration indication (TCI) states and second information for antenna ports;
  identifying that each of the TRPs repeatedly transmits same data via a physical downlink shared channel (PDSCH) in case that a number of code division multiplex (CDM) group indicated by the second information for antenna ports is one; and
  receiving data from the TRPs based on the identifying.

2. The method of claim 1, wherein the first information on the TCI states indicates a plurality of TCI states among a list of TCI states.

3. The method of claim 1, further comprising:
  identifying that each of the TRPs transmits different data via the PDS CH in case that the number of CDM group indicated by the second information for the antenna ports is not one.

4. The method of claim 1, wherein a number of times each of the TRPs repeatedly transmits the same data via the PDSCH is determined based on a number of TCI states indicated by the first information on the TCI states.

5. The method of claim 1, wherein a number of times each of the TRPs repeatedly transmits the same data via the PDSCH is indicated by a time domain resource allocation field included in the DCI.

6. The method of claim 1, further comprising:
  in case that a number of times each of the TRPs repeatedly transmits the same data via the PDSCH is greater than a number of TCI states indicated by the first information on the TCI states, applying each of the TCI states to each of slots used for receiving the same data from the TRPs based on predetermined patterns.

7. The method of claim 6, wherein the applying of the each of the TCI states to the each of slots further comprises:
  applying a first TCI state and a second TCI state to a first slot and a second slot of the slots, respectively based on a first pattern; and
  applying the first TCI state and the second TCI state to a third slot and a fourth slot of the slots, respectively based on the first pattern.

8. The method of claim 6, wherein the applying of the each of the TCI states to the each of slots further comprises:
applying a first TCI state to a first slot and a second slot of the slots based on a second pattern; and
applying a second TCI state to a third slot and a fourth slot of the slots based on the second pattern.

9. A terminal in a wireless communication system, the terminal comprising:
a transceiver; and
at least one processor configured to:
receive via the transceiver, from at least one of transmission and reception points (TRPs), downlink control information (DCI) including first information on transmission configuration indication (TCI) states and second information for antenna ports,
identify that each of the TRPs repeatedly transmits same data via a physical downlink shared channel (PDSCH) in case that a number of code division multiplex (CDM) group indicated by the second information for antenna ports is one, and
receive via the transceiver, from the TRPs, data based on the identification.

10. The terminal of claim 9, wherein the first information on the TCI states indicates a plurality of TCI states among a list of TCI states.

11. The terminal of claim 9, wherein the at least one processor is further configured to:
identify that each of the TRPs transmits different data via the PDSCH in case that the number of CDM group indicated by the second information for the antenna ports is not one.

12. The terminal of claim 9, wherein a number of times each of the TRPs repeatedly transmits the same data via the PDSCH is determined based on a number of TCI states indicated by the first information on the TCI states.

13. The terminal of claim 9, wherein a number of times each of the TRPs repeatedly transmits the same data via the PDSCH is indicated by a time domain resource allocation field included in the DCI.

14. The terminal of claim 9, wherein the at least one processor is further configured to:
in case that a number of times each of the TRPs repeatedly transmits the same data via the PDSCH is greater than a number of TCI states indicated by the first information on the TCI states, apply each of the TCI states to each of slots used for receiving the same data from the TRPs based on predetermined patterns.

15. The terminal of claim 14, wherein the at least one processor is further configured to:
apply a first TCI state and a second TCI state to a first slot and a second slot of the slots, respectively based on a first pattern, and
apply the first TCI state and the second TCI state to a third slot and a fourth slot of the slots, respectively based on the first pattern.

16. The terminal of claim 14, wherein the at least one processor is further configured to:
apply a first TCI state to a first slot and a second slot of the slots based on a second pattern, and
apply a second TCI state to a third slot and a fourth slot of the slots based on the second pattern.

\* \* \* \* \*